United States Patent
Gilliland et al.

(10) Patent No.: US 12,292,533 B2
(45) Date of Patent: *May 6, 2025

(54) BEAM STEERING LADAR SENSOR

(71) Applicant: Continental Autonomous Mobility US, LLC, Auburn Hills, MI (US)

(72) Inventors: Patrick B Gilliland, Santa Barbara, CA (US); Roger Stettner, Santa Barbara, CA (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 96 days.

This patent is subject to a terminal disclaimer.

(21) Appl. No.: 17/451,154

(22) Filed: Oct. 16, 2021

(65) Prior Publication Data

US 2022/0035006 A1 Feb. 3, 2022

Related U.S. Application Data

(63) Continuation of application No. 16/151,067, filed on Oct. 3, 2018, now Pat. No. 11,175,384, which is a continuation of application No. 14/656,936, filed on Mar. 13, 2015, now Pat. No. 10,126,411.

(51) Int. Cl.
| | |
|---|---|
| *G01S 7/481* | (2006.01) |
| *G01S 7/4863* | (2020.01) |
| *G01S 13/931* | (2020.01) |
| *G01S 17/894* | (2020.01) |
| *G01S 17/931* | (2020.01) |

(52) U.S. Cl.
CPC ............ *G01S 7/4814* (2013.01); *G01S 7/4811* (2013.01); *G01S 7/4817* (2013.01); *G01S 7/4863* (2013.01); *G01S 17/894* (2020.01); *G01S 17/931* (2020.01); *G01S 2013/93277* (2020.01)

(58) Field of Classification Search
CPC ............ H05B 33/0818; H05B 33/0848; H05B 33/0815; H05B 33/0824; H05B 33/083; G01S 17/10; G01S 7/484; G01C 3/08; H02M 7/42; Y02B 20/347
See application file for complete search history.

(56) References Cited

U.S. PATENT DOCUMENTS

| | | |
|---|---|---|
| 5,446,529 A | 8/1995 | Stettner et al. |
| 5,629,524 A | 5/1997 | Stettner et al. |
| 5,696,577 A | 12/1997 | Stettner et al. |

(Continued)

FOREIGN PATENT DOCUMENTS

| | | |
|---|---|---|
| EP | 2806288 A1 | 11/2014 |
| JP | H04191827 A | 7/1992 |

(Continued)

*Primary Examiner* — Luke D Ratcliffe

(57) ABSTRACT

In one embodiment, a ladar system includes a laser transmitter with at least one semiconductor laser having a pulsed laser light output. A laser drive circuit is connected to said at least one semiconductor laser and adapted to electrically drive said at least one semiconductor laser in a predetermined sequence. A laser beam steering mechanism is adapted to scan the pulsed laser light output sequentially through the field of view. A two-dimensional array of light sensitive detectors receive reflected light and an integrated circuit calculates a direct time of flight distance measurement.

11 Claims, 24 Drawing Sheets

(56) References Cited

U.S. PATENT DOCUMENTS

| | | | |
|---|---|---|---|
| 6,133,989 | A | 10/2000 | Stettner et al. |
| 6,362,482 | B1 | 3/2002 | Stettner et al. |
| 6,414,746 | B1 | 7/2002 | Stettner et al. |
| D463,383 | S | 9/2002 | Hwang |
| 2002/0117340 | A1 | 8/2002 | Stettner |
| 2005/0180149 | A1 | 8/2005 | Albou et al. |
| 2007/0181810 | A1* | 8/2007 | Tan ................ G01S 7/4811 250/341.1 |
| 2008/0040004 | A1* | 2/2008 | Breed ............ B60R 21/0134 701/45 |
| 2013/0242283 | A1* | 9/2013 | Bailey ............ G01S 7/4813 356/4.01 |
| 2015/0009485 | A1 | 1/2015 | Mheen et al. |
| 2015/0219764 | A1* | 8/2015 | Lipson .............. G01S 17/89 356/4.01 |

FOREIGN PATENT DOCUMENTS

| | | |
|---|---|---|
| JP | H08236868 A | 9/1996 |
| JP | 2004325183 A | 11/2004 |
| JP | 2005510853 A | 4/2005 |
| JP | 2005195601 A | 7/2005 |
| JP | 2005233966 A | 9/2005 |
| JP | 2006038686 A | 2/2006 |
| JP | 2007205976 A | 8/2007 |
| JP | 2012058124 A | 3/2012 |
| JP | 2015007615 A | 1/2015 |

\* cited by examiner

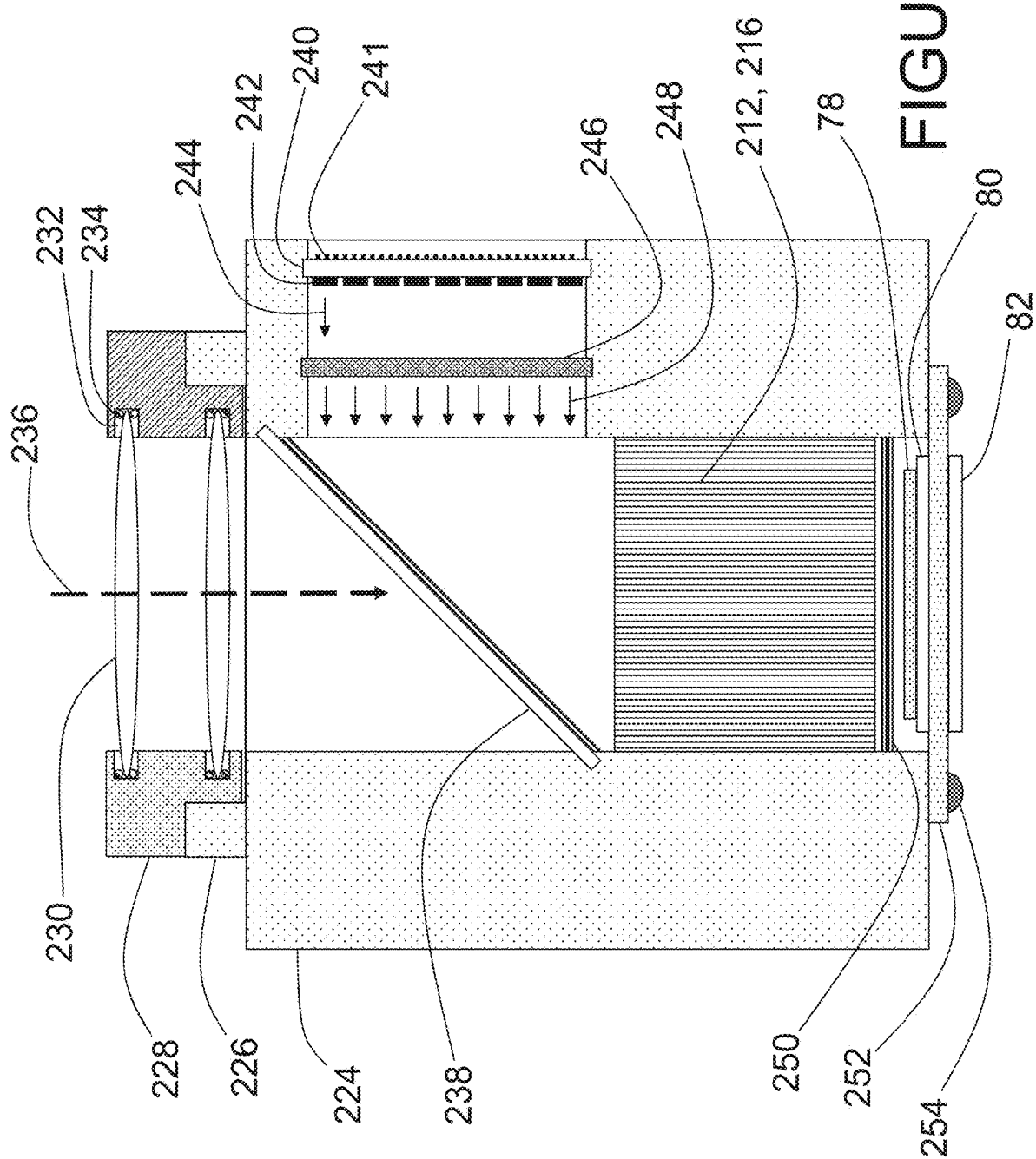

BEAM STEERING LADAR SENSOR

CROSS REFERENCE TO RELATED APPLICATION

This application is a continuation of patent application Ser. No. 16/151,067, filed Oct. 3, 2018, which is a continuation of patent application Ser. No. 14/656,936, filed Mar. 13, 2015, now U.S. Pat. No. 10,126,411, each of which is hereby incorporated by reference.

TECHNICAL FIELD

The embodiments disclosed herein relate generally to 3-D image generation and the identification and tracking of objects, and more particularly to LADAR sensors for mobile applications such as road hazard avoidance, collision avoidance, and autonomous navigation. The invention compensates for the issues arising from the operation of a ladar sensor having a limited optical power output.

BACKGROUND

The 3-D imaging technology disclosed in Stettner et al, U.S. Pat. Nos. 5,446,529, 6,133,989 and 6,414,746 provides with a single pulse of light, typically pulsed laser light, all the information of a conventional 2-D picture along with the third dimensional coordinates; it furnishes the 3-D coordinates of everything in its field of view. This use is typically referred to as flash 3-D imaging in analogy with ordinary digital 2-D cameras using flash attachments for a self contained source of light. As with ordinary 2-D digital cameras, the light is focused by a lens on the focal plane of the LADAR sensor, which contains an array of pixels called a focal plane array (FPA). In the case of a LADAR sensor these pixels are "smart" and can collect data which enables a processor to calculate the round-trip time of flight of the laser pulse to reflective features on the object of interest.

Many systems have been proposed to meet the challenge of using optical imaging and video cameras in a vehicle system to create 3-D maps of scenes and models of solid objects, and to use the 3-D database to navigate, steer, and avoid collisions with stationary or moving objects. Stereo systems, holographic capture systems, and those which acquire shape from motion, have not been able to demonstrate adequate performance in this application, but 3D LADAR based systems have shown the ability to rapidly capture 3-D images of objects and roadway features in the path of a moving vehicle, or traveling on an intersecting path, with sufficient speed and accuracy to allow the host vehicle to avoid collisions and road hazards, and steer the best path. In order to produce a low cost and rugged design, it is foreseeable there will be a need to use a semiconductor type laser pulse transmitter having a limited optical output power.

It is therefore desirable to provide a LADAR sensor capable of operating with a low power semiconductor laser array to illuminate the field of view of the LADAR sensor. It is further desirable that the LADAR sensor is capable of mapping the entire area surrounding the vehicle, and allows for the avoidance of other moving vehicles, road hazards, and pedestrians.

BRIEF SUMMARY

A ladar sensor according to the present embodiments incorporates a pulsed semiconductor laser to illuminate a scene in the field of view of the ladar sensor. Typically, a single very powerful laser pulse is optically diffused across the entire field of view by a fixed diffusing optic. The reduced power of the semiconductor laser may be offset by improved sensitivity of the ladar receiver, or by spatially concentrating the output of the semiconductor laser, and sweeping the concentrated beam across the field of view. A focal plane array of optical detectors is positioned behind a light receiving and focusing lens, and a readout integrated circuit is connected to the electrical outputs of the detectors of the focal plane array. Within the readout integrated circuit, an array of unit cell electrical circuits, amplifies and detects incoming light pulses which have been converted to electrical pulses in the detector elements of the focal plane array. Each unit cell electrical circuit is connected to a high speed timing clock, and within each unit cell is a digital timer. The digital timer is started counting by the flash of the scene illuminating optical pulse, and counts the number of cycles of the timing clock. The digital counter is frozen at the time of detection of an electrical pulse in the unit cell, which happens at the time of arrival of an incoming optical pulse. Thus the range to each reflective surface within the field of view of the ladar system may be sensed and digitally measured.

In alternative embodiments, each ladar sensor may include an optical gain element in the optical receiver path, between the light concentrating and focusing lens, and the focal plane array of optical detectors. This optical gain element may be optically pumped, as in the example of an erbium doped fiber amplifier, or electrically pumped as in the case of a semiconductor optical amplifier.

In other embodiments, each ladar sensor may have a focal plane array of detectors of indium gallium arsenide formed on a substrate of indium phosphide, gallium arsenide, or silicon. In a further embodiment, an electrical amplifier array may be interposed between the focal plane array of optical detectors and the readout integrated circuit. In yet another embodiment, the electrical amplifier array and the readout integrated circuit may be provided with through hole vias through the substrate to eliminate wirebonds, and thereby enable the low cost and low parasitic packaging of the focal plane array and readout integrated circuit.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIG. 8 is a cutaway side view of a ladar sensor having an optical gain block of fused fibers which are optically pumped by a VCSEL array coupled through a diffusing element and a 45° dichroic mirror;

DETAILED DESCRIPTION

Figure 1:
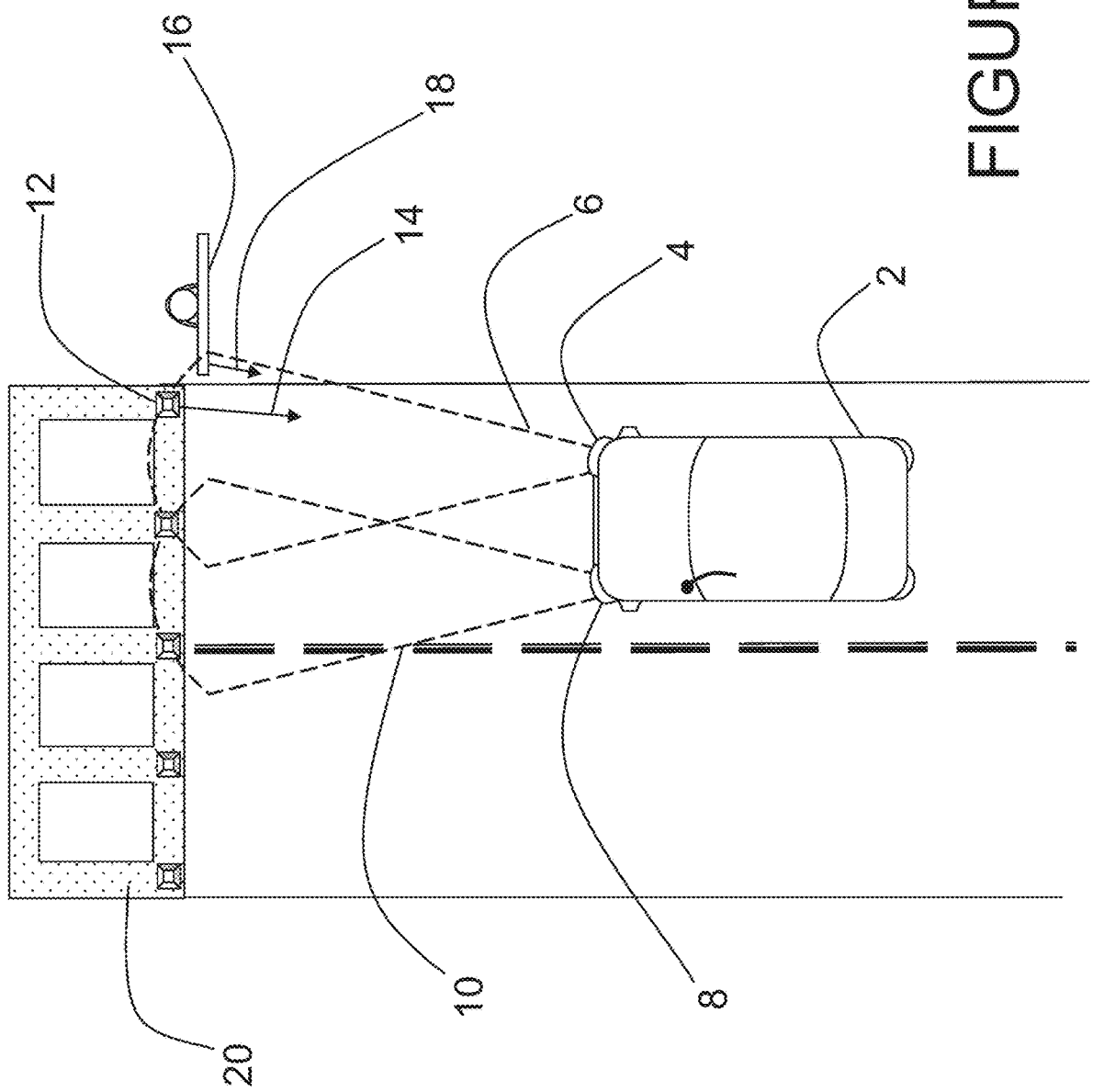
FIG. 1 is a diagram of a typical optical overload scenario with a first ladar sensor at the front right of a vehicle receiving strong light back scattered from a retroreflector embedded in the pavement, and from a stop sign, which also has retroreflecting elements embedded in the surface.

This application contains new subject matter related to previous U.S. Pat. Nos. 5,696,577, 6,133,989, 5,629,524, 6,414,746, 6,362,482, D463,383, and U.S. patent application Ser. No. 10/066,340 filed on Jan. 31, 2002 and published as US 2002/0117340 A1, the disclosures of which are incorporated herein by reference.

The embodiments disclosed herein enable a compact imaging ladar system having improved performance. The applications for such a system may be in automotive collision avoidance and autonomous navigation, terrain mapping, landing and docking, and 3D movie/graphics capture. The improvements include an optical gain block which may be constructed from an array of erbium doped fibers, or formed in a semiconductor. In a multi-ladar installation, a facility to coordinate the illuminating pulses of a first ladar transmitter with the receiver of a second ladar is described which may reduce the effects of saturation due to a corner reflector in the field of view. Additionally, a number of improvements to the detector array subassembly are shown. The hybrid assembly of detector array and readout integrated circuit (ROIC) incorporates a number of novel features. The use of a separate analog amplifier array situated between the detector array and readout IC allows for enhanced system responsivity. Through silicon vias (TSVs) are used on the amplifier array and on the readout IC to enable a compact hybrid focal plane array (FPA) assembly which is inexpensive to assemble and has higher electrical performance due to a reduction in parasitic inductance in the package. Two new detector technologies are also described. A PIN detector structure of indium gallium arsenide is formed on a strained metamorphic layer over a gallium arsenide substrate, allowing for the processing of inexpensive GaAs wafers up to 6" in diameter. The second detector structure involves an InGaAs PIN structure bonded at the wafer level to an inexpensive silicon substrate. This technology allows for extended thermal performance, and standard processes for solder bump interconnect. The use of a laser beam steering mechanism allows the ladar sensor to illuminate the field of view in a number of sequential steps, reducing the peak power requirement for the laser beam. The use of a beam steering mechanism enables the use of pulsed semiconductor lasers, which are known to have lower power output than their solid state counterparts. A number of laser beam steering designs are described which enable a ladar sensor to use a lower power pulsed semiconductor laser, and scan the beam sequentially through the field of view. A vehicle mounted ladar system may comprise a number of side mounted, rear mounted, or forward looking ladar sensors of the type described herein. These ladar sensors can be connected to a central ladar system controller which synthesizes the available data from each of the independent ladar sensors into a composite 3D map of the immediate area in a full 360 degree arc surrounding the vehicle. In a preferred embodiment, conventional 2D still images or video sequences may be used to improve the quality of 3D solid models and scene maps.

In a vehicle application, the ladar sensor may be incorporated into a headlight, taillight, or other auxiliary lamp assembly. The ladar sensor may also be part of a backup light, rearview mirror assembly, or mounted behind an opening in a bumper or grill assembly, or may be high mounted behind the windshield, on a roof support, or in a modular assembly mounted through a cutout in a body panel at the periphery of the vehicle. The ladar sensor typically incorporates a hybrid assembly of focal plane array and readout integrated circuit, and the readout IC is arranged as an array of unit cell electrical circuits, and each unit cell is configured to fit in an array of identical spacing and order as the mating focal plane array (FPA). The ladar sensor in a preferred embodiment is capable of working in a flash mode as described above, or in a multi-pulse mode, or in a pulsed continuous-wave mode as the situation dictates. The ladar system incorporating the ladar sensor may also have a number of features which enable full 3D object modeling and tracking, as well as scene enhancements derived from the merging of 2D and 3D data bases and managing of both 3D ladar sensors and conventional 2D video cameras.

Each of the light sensitive detectors of the FPA has an output producing an electrical response signal from a reflected portion of the laser light output. The electrical response signals are connected to a readout integrated circuit (ROIC) with a corresponding array of unit cell electrical circuits. Each of the unit cell electrical circuits has an input connected to one of the light sensitive detector outputs, an electrical response signal amplifier and a demodulator, and a range measuring circuit connected to an output of the electrical response signal demodulator. The demodulator may be a voltage sampler and analog shift register for storing sequential samples of the electrical response signals, or it may comprise a mixer, integrator, or matched filter. In the sampling mode, each unit cell uses a reference clock to time the samples being taken in response to the captured reflection of the laser light from a target surface. The demodulation may also take place external to the readout integrated circuit, by a fast digital processor operating on a sequence of digitized samples from each pixel. The fast digital processor may employ algorithms which utilize weighted sums of sequential analog samples, or use fast Fourier transforms, convolution, integration, differentiation, curve fitting, or other digital processes on the digitized analog samples of the electrical response. The fast digital processor may also employ algorithms which isolate or segment the roadway from other objects and objects from each other. Such objects may be automobiles, bicycles, motorcycles, trucks, persons, animals, walls, signs, road obstructions etc. These algorithms may compute position and orientation, as well as object velocity. Objects, their orientation, position and velocity may be transferred to a central computer for further processing and decision making. Each unit cell circuit has the ability to preserve the shape of the returned ladar pulse, and to make inferences about the shape of the surface within a pixel boundary as seen projected at a distance from the focal plane array, based on the shape of the reflected light pulse. The range measuring circuit is further connected to a reference signal providing a zero range reference for the modulated laser light output.

FIG. 1 depicts a situation which illustrates one of the challenges encountered in a field application of a ladar sensor of the instant invention. In this diagram, a vehicle 2 has a long range ladar sensor 4 mounted in a headlight assembly at the front of the vehicle. The associated illumination pattern 6, is a fan shape shown by the dashed lines. The illumination pattern 6 reflects off the "cateye" type retro-reflector 12 embedded in the pavement in crosswalk 20, producing a reflected ray 14. Cateye retro-reflectors are prismatic reflectors which are analogous to a corner cube in optics design. Cateye retro-reflectors were designed in to provide excellent road boundary marking in low light and blackout conditions. The illumination pattern 6 also reflects off of the surface of retro-reflecting stop sign 16, producing reflected ray 18. Many stop signs use a retro-reflecting film such as 3M™ Diamond Grade™ reflective sheeting, which is used for traffic control and guidance signs and devices. The film is highly reflective, durable, and meets a wide variety of sign visibility needs in all light and weather conditions. Other stop signs use an enhanced film having a prismatic microstructure such as 3M™ High Intensity Prismatic (HIP) Sheeting. This sheeting provides high levels of retro-reflectivity for various traffic scenarios and has excellent long-term reflectivity and durability. A second long range ladar sensor 8, with an illumination pattern 10 is mounted in a headlight assembly on the driver side of the vehicle 2. Retro-reflected ray 14 and retro-reflected ray 18 represent very intense optical signals which have the potential to saturate the detectors of the focal plane array of ladar sensor 4. The intense retro-reflected rays 14 and 18 may also create optical crosstalk in the focal plane array of ladar sensor 4.

Figure 2:
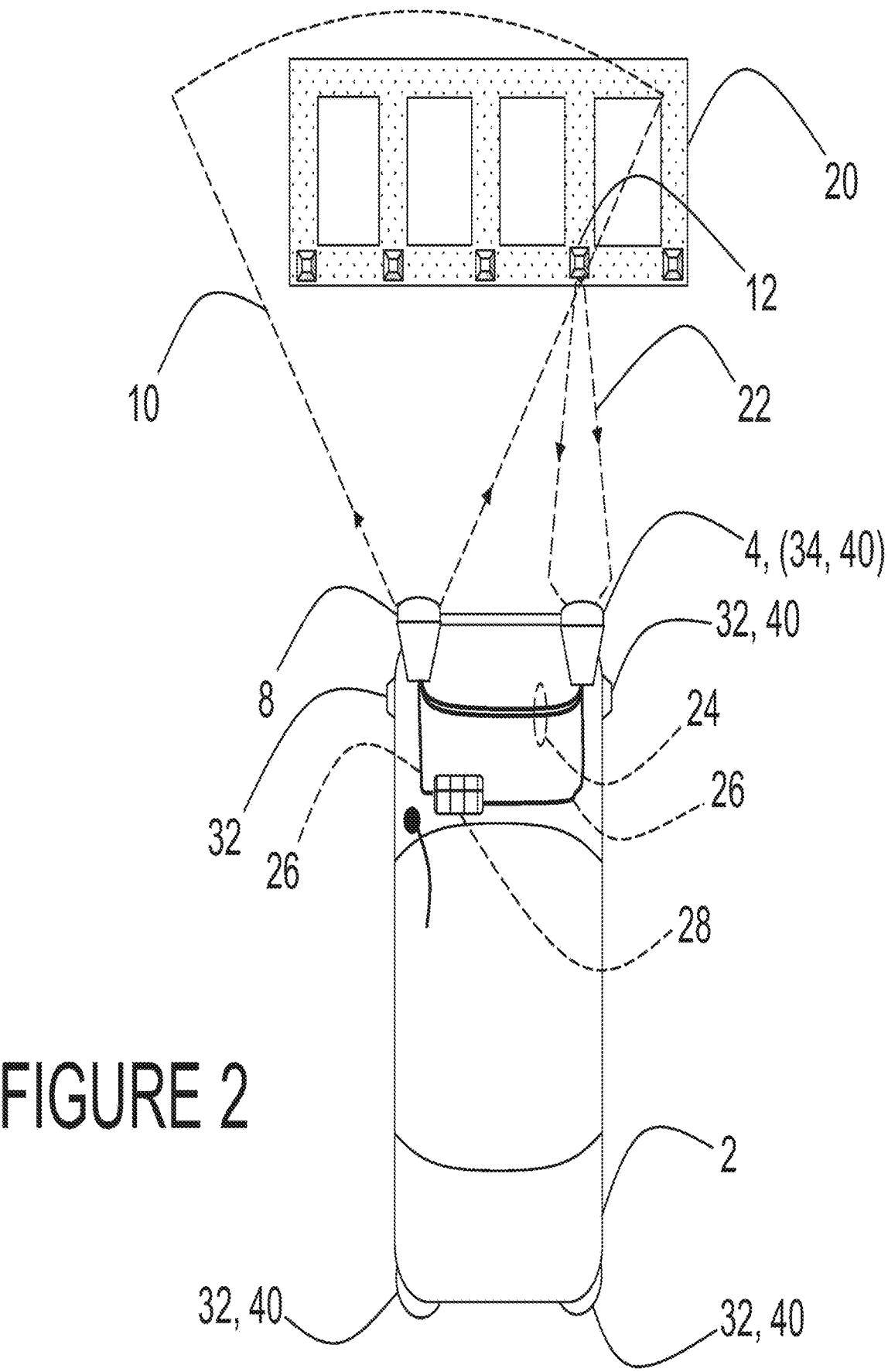
FIG. 2 shows one solution to the optical overload scenario illustrated in FIG. 1. Two forward looking ladar sensors are positioned at the front of the vehicle, and the ladar sensor on the right, closest to the angle of the retroreflectors, responds to a laser pulse transmitted by the leftmost ladar sensor. Bidirectional connections are shown between the ladar sensors which give the rightmost ladar sensor a precise time zero reference signal indicating the transmission of a scene illuminating laser pulse from the leftmost ladar sensor, and vice versa.

FIG. 2 shows the advantages of the instant invention. The illuminating pattern 10 of the long range ladar sensor embedded in the driver side headlight assembly 8 is now illuminating the cateye retro-reflector 12 at an oblique angle. The passenger side ladar sensor 4 has been turned off, or is between pulse intervals. The reflection 22 from the cateye retro-reflector 12 from an oblique illumination will be like an ordinary diffuse reflector surface and will not have the intense low divergence characteristic of the cateye prismatic retro-reflector 12 when illuminated with light at normal incidence from the passenger side long range ladar sensor 4 as shown in FIG. 1. In order to produce an accurate range measurement in the presence of the intense reflections from a retro-reflector 12 positioned normally to the illuminating beam of the long range ladar sensor 4, the passenger side ladar sensor 4 is operated in a receive only mode in between pulses which it may send out at regular intervals. The cooperating driver side ladar sensor 8 illuminates the scene and the cateye retro-reflector 12. To accurately gauge the distance to the retro-reflector 12, or to any object in the field of view, the passenger side ladar sensor must receive an indication of the transmission of an illuminating laser pulse from driver side ladar 8. This indication may come in one of two paths, the first being a laser flash signal directly from the driver side ladar sensor 8 over bidirectional connections 24. Bidirectional connections 24 may be either electrical connections or fiber optic connections, depending on the vehicle design. The second path for indicating the transmission of an illuminating pulse may come from a central ladar system controller 28 over bidirectional connections 26. Either approach may be used, with similar results once the system is calibrated for the delays caused by the transmission of the laser flash signal over bidirectional connections 24 or 26. Likewise, the driver side ladar sensor 8 may be operated in a receive only mode, with the scene illuminating laser pulse coming from the passenger side laser transmitter in ladar sensor 4. Also shown are a number of short range ladar sensors 32 mounted at the corners of vehicle 2 in familiar body panel cutouts for turn signals, taillights, brake lights, etc. Also mounted in the same assemblies 32 which house the short range ladar sensors, there may be automotive signal lights, such as turn signal, taillights, brake lights, and visible light or infrared 2D cameras 40. The long range ladar sensors 34 may also share space in the headlight assemblies 4, 8 with visible or infrared 2D cameras 40.

Figure 3:
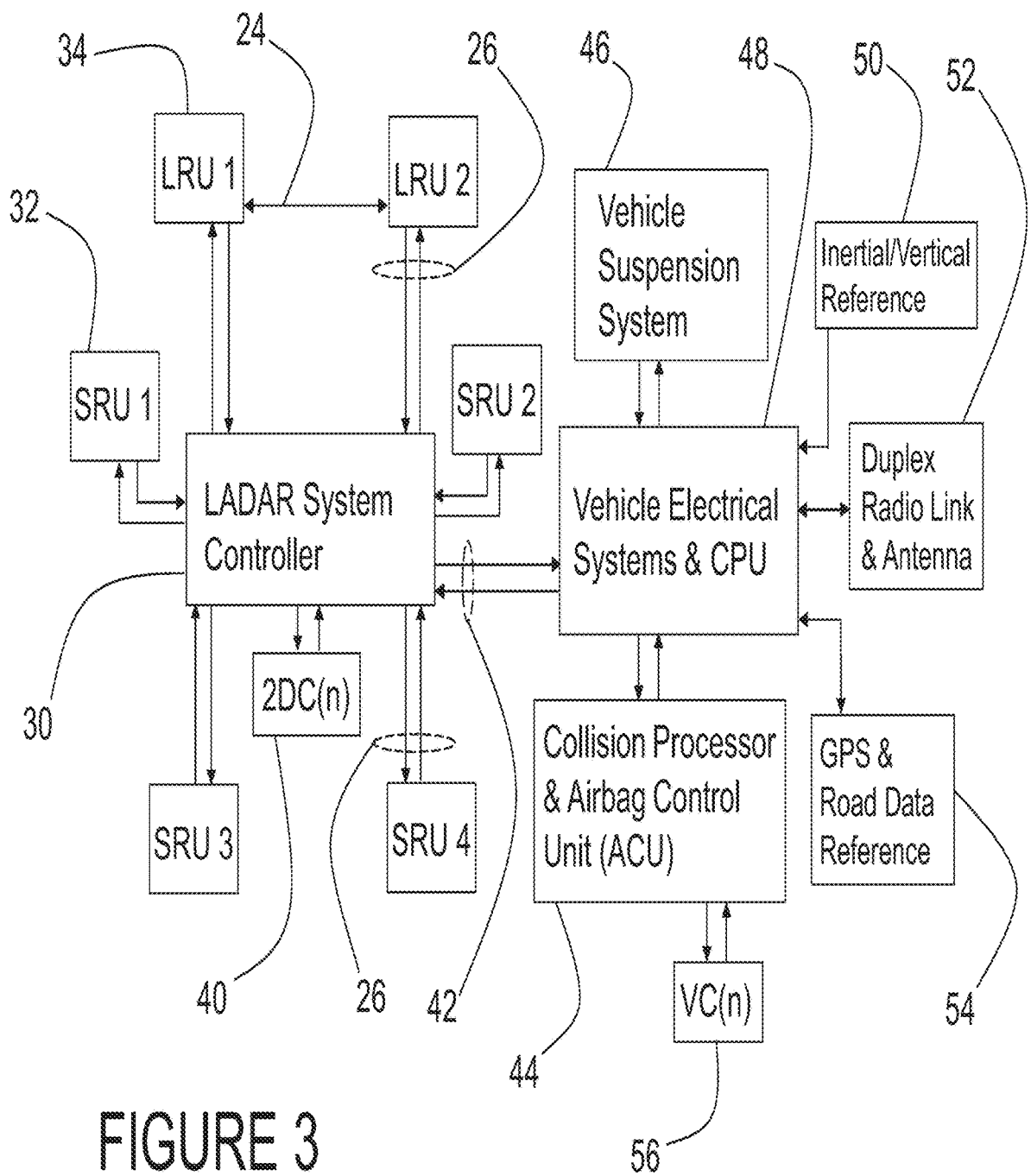
FIG. 3 is a block diagram showing the elements of a typical vehicle installation, including the vehicle electrical systems, CPU, and the subsystems which regulate the vehicle suspension, provide an inertial navigation reference, provide global positioning references, make decisions to deploy airbags, and communicate via duplex radio link to the outside world.

FIG. 3 is a block diagram showing details of a ladar system controller 30 and the interconnections with the cooperating systems of a host vehicle 2. The ladar system controller 30 is an intermediate function which integrates all of the 3D data captured by the various ladar sensors installed on the host vehicle while monitoring the status of these sensors, and providing control inputs thereto. The ladar system controller 30 may be subsumed as a piece of software or hardware into the vehicle CPU 48 in some vehicle designs. The ladar system controller 30 transmits commands to the short range ladar sensors SRU1-4 32, and to the long range ladar sensors LRU1-2 34. A fiber cable and wire harness 26 provides the physical media for the transfer of the commands from the ladar system controller 30 to the various ladar sensors. 3D data and status signals are returned from the various ladar sensors to the ladar system controller 30 through fiber cable and wire harness 26. Likewise, command signals are sent to a number (n) of 2D cameras 40, and status and image data are returned from the 2D cameras via wire harness 26 to ladar system controller 30. Both of the long range sensor units 34 connect through a set of bidirectional connections which logically include the transmitters and receivers within each long range sensor unit 34, the physical media of fiber cable and wire harness 26, and the transmitters and receivers of the ladar system controller 30. Each short range sensor unit 32 connects through a set of bidirectional connections which logically include the transmitters and receivers within each short range sensor unit, the physical media of fiber cable and wire harness 26, and the transmitters and receivers of the ladar system controller 30. In some installations, connections directly between ladar sensors 34 may be made through bidirectional connections 24. The ladar system controller 30 including D/A and A/D signal converters, may reside completely or in part on a readout integrated circuit (in FIG. 4). The ladar system controller 30 may have a scene processing capability which allows it to combine the 3D frames received from each of the operational ladar sensors into a composite 3D map of the entire space directly in front of and surrounding the vehicle 2 and may also merge the 3D map with 2D image data received from a number (n) of 2D still or video cameras 40 to provide enhanced resolution, color, and contrast. The addition of conventional 2D still or video cameras 40 provide the system with enhanced capability for object identification. Ladar system controller 30 receives status data from the ladar sensors indicating laser temperature, transmitted laser pulse power and pulse shape, receiver temperature, background light levels, etc. and makes decisions about adjustments of global input parameters to the various ladar sensors being controlled. Global settings for detector bias, trigger sensitivity, capture modes, filter bandwidth, etc. may be sent from ladar system controller 30 to a given ladar sensor which may override the local settings originally set or adjusted by a local control processor residing within a particular ladar sensor. The ladar system controller 30 may also have internal a non-volatile memory to provide a storage location for the programs which run on the ladar system controller 30, and which may be used to store status data and other data useful at start-up of the system. Residing on ladar system controller 30 is a communications port for passing data and control commands and status signals over bidirectional connections 42. The communications port is typically an Ethernet port or Gigabit Ethernet port, but may be a CAN bus, USB, IEEE1394, Infiniband, or other type data port, and is connected to provide bidirectional communications with the vehicle electrical systems and central processing unit 48. Connections 42 may be optical, electrical, or a combination of both, and include any transmitters and receivers necessary to condition and transmit the data signals in both directions. The 3D range data derived from the reflections of the modulated laser light allows for an initial object model to be determined, and for some object identification to take place in a processor of the individual ladar sensors installed on vehicle 2. Refinements of the object model may be made at higher levels in the system where data from the several sensors may be integrated with the data from previous frames. This capability of looking at historical data as well as current data, allows for some road hazards and collision threats to be viewed from a plurality of angles as the vehicle 2 travels forward, thus eliminating some shadows, while additional shape information is developed from the multiple angles of observation.

Each of the individual ladar sensors may include data processors to reduce the processing load on the ladar system controller 30, the vehicle CPU 48, and the collision processor 44; for example, developing the point cloud and isolating/segmenting objects in the field of view and object speed from the point cloud. Conventional 2D visible light or infrared viewing cameras 40 may be embedded within the ladar sensor subsystem, and may be part of a sub-assembly containing a ladar sensor. A number (n) of other visible light 2D still or video cameras 56 may connect directly to the vehicle collision processor 44 and produce scene data complementary to the 3D data generated by the various ladar sensors mounted to the vehicle. The 2D still or video cameras 56 may also operate at either visible or infrared wavelengths. Bidirectional electrical connections 42 also serve to transfer 3D data maps, status, and control signals between ladar system controller 30 and the vehicle electrical systems and central processing unit (CPU) 48. At the core of the vehicle, an electronic brain may control all functioning of the vehicle 2, and typically controls all other subsystems and co-processors. The electronic brain, or central processing unit (CPU 48) is here lumped together with the basic electrical systems of the vehicle, including battery, headlights, wiring harness, etc. The vehicle suspension system 46 receives control commands and returns status through bidirectional electrical connections, and is capable of modifying the ride height, spring rate, and damping rate of each of the vehicle wheels independently. An inertial reference 50 also has a vertical reference, or gravity sensor as an input to the CPU 48. A global positioning reference 54 may also be connected to the vehicle CPU 48. The GPS reference 54 may also have a database of all available roads and conditions in the area which may be updated periodically through a wireless link. A duplex radio link 52 may also be connected to CPU 48, and may communicate directly with other vehicles in close range, sharing position, speed, direction, and vehicle specific information to facilitate collision avoidance and the free flow of traffic. The duplex radio link may also receive local positional references, road data, weather conditions, and other information important to the operations of the vehicle 2 from a central road conditions database through roadside antennas or cellular stations. The vehicle 2 may also provide vehicle status and road conditions updates to the central road conditions database via radio link 52, allowing the central road conditions database to be augmented by any vehicle equipped with ladar sensors and a radio link. A collision processor and airbag control unit 44 connects bidirectionally to CPU 48 as well, receiving inputs from a number of accelerometers, brake sensors, wheel rotational sensors, ladar sensors, etc. ACU 44 makes decisions on the timing and deployment of airbags and other restraints. Though the system of FIG. 3 is shown integrated with the vehicle 2 on which the system is nominally installed, and which is often an automobile, the system, and any of the described components and subsystems are designed to be installed on any number of moving vehicles or stationary platforms.

Figure 4:
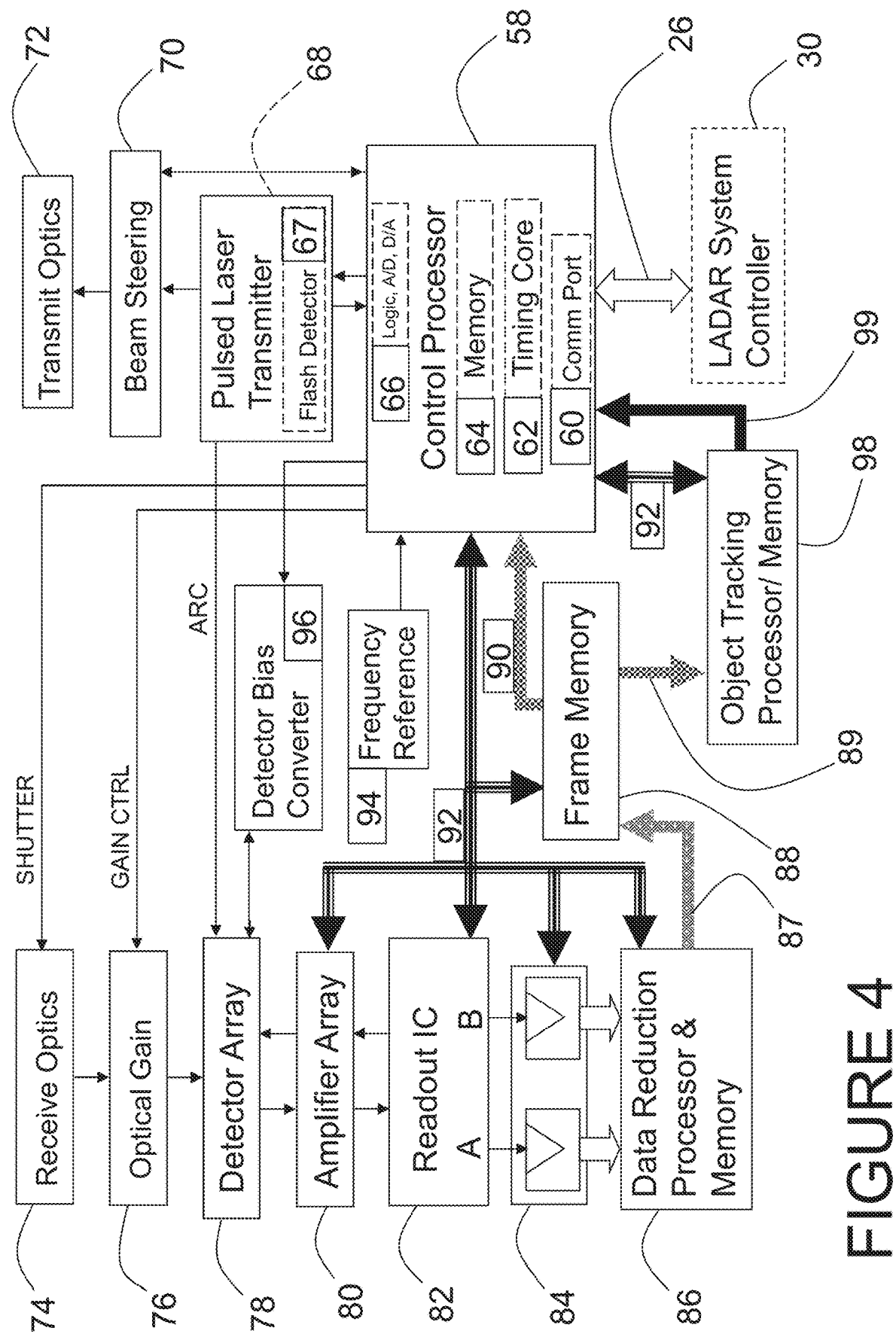
FIG. 4 is a block diagram of a beam steering LADAR sensor which describes the functions and connections between the ladar sensor control processor, and subsystems for creating laser illuminating pulses, receiving the reflected laser pulses, reducing the data, storing the images, and identifying objects within the image data sets.

FIG. 4 is a block diagram of a ladar sensor which describes both long range ladar sensors 34 and short range sensors 32 typical of the preferred embodiment. Major improvements described herein include the addition of a beam steering mechanism 70, an optical gain block 76, an electronic amplifier array 80, and new detector and focal plane array (FPA) packaging options. The first embodiment provides a 128×128 or 128×64 detector array 78 of light detecting elements which is stacked atop a readout integrated circuit 82 using a hybrid assembly method. In other embodiments of the design, M×N focal plane arrays of light detecting elements with M and N having values from 2 to 1024 and greater are anticipated. The functional elements depicted in FIG. 4 may first be described with respect to the elements of a typical long range ladar sensor 34. A control processor 58 controls the functions of the major components of the ladar sensor 34. Control processor 58 connects to pulsed laser transmitter 68 through bidirectional electrical connections (with interface logic, analog to digital (A/D) and digital to analog (D/A) converters 66) which transfer commands from control processor 58 to pulsed laser transmitter 68 and return monitoring signals from pulsed laser transmitter 68 to the control processor 58. The interface logic, including analog to digital (A/D) and digital to analog (D/A) converters 66, may reside completely or in part on an integrated circuit. A light sensitive diode detector (Flash Detector) 67 is placed at the back facet of the laser so as to intercept a portion of the laser light pulse produced by the pulsed laser transmitter 68. An optical sample of the outbound laser pulse taken by an optical sampler from the front facet of pulsed laser transmitter 68 is routed to a corner of the detector array 78 as an automatic range correction (ARC) signal, typically over a fiber optic cable. The pulsed laser transmitter 68 may be a solid-state laser, monoblock laser, semiconductor laser, fiber laser, or an array of semiconductor lasers. It may also employ more than one individual laser to increase the data rate. In a preferred embodiment, pulsed laser transmitter 68 is an array of vertical cavity surface emitting lasers (VCSELs). In an alternative embodiment, pulsed laser transmitter 68 is a disc shaped solid state laser of erbium doped phosphate glass pumped by 976 nanometer semiconductor laser light.

In operation, the control processor 58 initiates a laser illuminating pulse by sending a logic command or modulation signal to pulsed laser transmitter 68, which responds by transmitting an intense burst of laser light through beam steering mechanism 70 and transmit optics 72. In the case of a Q-switched solid state laser based on erbium glass, neodymium-YAG, or other solid-state gain medium, a simple bi-level logic command may start the pump laser diodes emitting into the gain medium for a period of time which will eventually result in a single flash of the pulsed laser transmitter 68. In the case of a semiconductor laser which is electrically pumped, and may be modulated instantaneously by modulation of the current signal injected into the laser diode, a modulation signal of a more general nature is possible, and may be used with major beneficial effect. The modulation signal may be a flat-topped square or trapezoidal pulse, or a Gaussian pulse, or a sequence of pulses. The modulation signal may also be a sinewave, gated or pulsed sinewave, chirped sinewave, or a frequency modulated sinewave, or an amplitude modulated sinewave, or a pulse width modulated series of pulses. The modulation signal is typically stored in memory 64 as a lookup table of digital memory words representative of analog values, which lookup table is read out in sequence by control processor 58 and converted to analog values by an onboard digital-to-analog (D/A) converter 66, and passed to the pulsed laser transmitter 68 driver circuit. The combination of a lookup table stored in memory 64 and a D/A converter, along with the necessary logic circuits, clocks, and timers 62 resident on control processor 58, together comprise an arbitrary waveform generator (AWG) circuit block. The AWG circuit block may alternatively be embedded within a laser driver as a part of pulsed laser transmitter 68. Transmit optics 72 diffuse the high intensity spot produced by pulsed laser transmitter 68 substantially uniformly over the desired field of view to be imaged by the ladar sensor 34. An optical sample of the transmitted laser pulse (termed an ARC signal) is also sent to the detector array 78 via optical fiber. A few pixels in a corner of detector array 78 are illuminated with the ARC (Automatic Range Correction) signal, which establishes a zero time reference for the timing circuits in the readout integrated circuit (ROIC) 82. Each unit cell of the readout integrated circuit 82 has an associated timing circuit which is started counting by an electrical pulse derived from the ARC signal. Alternatively, the flash detector 67 signal may be used as a zero reference in a second timing mode. Though the ARC signal neatly removes some of the variable delays associated with transit time through the detector array 78, additional cost and complexity is the result. Given digital representations of the image frames, the same task may be handled in software/firmware by a capable embedded processor such as data reduction processor 86. When some portion of the transmitted laser pulse is reflected from a feature in the scene in the field of view of the ladar sensor 34, it may be incident upon receive optics 74, typically comprising the lens of a headlamp assembly and an array of microlenses atop detector array 78. Alternative embodiments use enhanced detectors which may not require the use of microlenses. Other alternative embodiments of receive optics 74 employ diffractive arrays to collect and channel the incoming light to the detector array 78 individual elements. Pulsed laser light reflected from a feature in the scene in the field of view of receive optics 74 is focused onto an individual detector element of the detector array 78. This reflected laser light optical signal is then detected by the affected detector element and converted into an electrical current pulse which is then amplified by an associated pixel amplifier circuit of optional amplifier array 80, and the unit cell electrical circuit of the readout integrated circuit 82, and the time of flight measured. Thus, the range to each reflective feature in the scene in the field of view is measurable by the ladar sensor 34. The detector array 78, amplifier array 80, and readout integrated circuit 82 may be an M×N or N×M sized array. Control processor 58 directs the beam steering mechanism 70 to deflect the output beam of the pulsed laser transmitter 68 into a selected portion of the scene in the forward path of vehicle 2, as illustrated in FIG. 1.

Continuing with FIG. 4, receive optics 74 may be a convex lens, spherical lens, cylindrical lens or diffractive grating array. An optional mechanical shutter may be used by control processor 58 to calibrate the system or protect the detector array 78. This capabilty is described in detail in association with FIG. 9. Receive optics 74 collect the light reflected from the scene and focus the collected light on the detector array 78. In a preferred embodiment, detector array 78 is formed in a thin film of gallium arsenide deposited epitaxially atop an indium phosphide semiconducting substrate. Typically, detector array 78 would have a set of cathode contacts exposed to the light and a set of anode contacts electrically connected to the supporting amplifier array 80 and readout integrated circuit 82 through a number of indium bumps deposited on the detector array 78. The cathode contacts of the individual detectors of detector array 78 are then connected to a detector bias voltage grid on the illuminated side of the array. Each anode contact of the detector elements of detector array 78 is thus independently connected to an input of a pixel amplifier of optional amplifier array 80, or directly to a unit cell electronic circuit of readout integrated circuit 82. This traditional hybrid assembly of detector array 78 and readout integrated circuit 82 may still be used, but new technology may reduce inter-element coupling, or crosstalk, and reduce leakage (dark) current and improve efficiency of the individual detector elements of detector array 78. Other detector array structures are developed herein and described in association with FIGS. 11, 15, and 16. Readout integrated circuit 82 comprises a rectangular array of unit cell electrical circuits. Each unit cell has the capability of amplifying a low level photocurrent received from an optoelectronic detector element of detector array 78, and sampling the amplifier output. Typically the unit cell is also capable of detecting the presence of an electrical pulse in the pixel amplifier output associated with a light pulse reflected from the scene and intercepted by the detector element of detector array 78. The detector array 78 may be an array of avalanche photodiodes, capable of photoelectron amplification, and modulated by an incident light signal at the design wavelength. The detector array 78 elements may also be a P-intrinsic-N (PIN) photodiodes or N-intrinsic-P (NIP) photodidodes with the dominant carrier being holes or electrons respectively. In the case of an NIP detector structure, the corresponding ROIC 82 would have the polarity of the bias voltages and amplifier inputs adjusted accordingly. The hybrid assembly of detector array 78 and readout integrated circuit 82 of the preferred embodiment is shown in FIGS. 11-17, and the assembly is then mounted to a supporting circuit assembly, typically on a FR-4 substrate or ceramic substrate. The circuit assembly typically provides support circuitry which supplies conditioned power, a reference clock signal, calibration constants, and selection inputs for the readout column and row, among other support functions, while receiving and registering range and intensity outputs from the readout integrated circuit 82 for the individual elements of the detector array 78. Many of these support functions may be implemented in Reduced Instruction Set Computer (RISC) processors which reside on the same circuit substrate. A detector bias converter circuit 96 applies a time varying detector bias to the detector array 78 which provides optimum detector bias levels to reduce the hazards of saturation in the near field of view of detector array 78, while maximizing the potential for detection of distant objects in the field of view of detector array 78. The contour of the time varying detector bias supplied by detector bias converter 96 is formulated by control processor 58 based on feedback from the data reduction processor 86, indicating the reflectivity and distance of objects or points in the scene in the field of view of the detector array 78. Control processor 58 also provides several clock and timing signals from a timing core 62 to readout integrated circuit 82, data reduction processor 86, analog-to-digital converters 84, object tracking processor 98, and their associated memories. Control processor 58 relies on a temperature stabilized or temperature compensated frequency reference 94 to generate a variety of clocks and timing signals. Temperature stabilized frequency reference 94 may be a temperature compensated crystal oscillator (TCXO), dielectric resonator oscillator (DRO), or surface acoustic wave device (SAW). Timing core 62 resident on control processor 58 may include a high frequency tunable oscillator, programmable prescaler dividers, phase comparators, and error amplifiers.

Continuing with FIG. 4, control processor 58, data reduction processor 86, and object tracking processor 98 each have an associated memory for storing programs, data, constants, and the results of operations and calculations. These memories, each associated with a companion digital processor, may include ROM, EPROM, or other non-volatile memory such as flash. They may also include a volatile memory such as SRAM or DRAM, and both volatile and non volatile memory may be integrated into each of the respective processors. A common frame memory 88 serves to hold a number of frames, each frame being the image resulting from a single laser pulse. Both data reduction processor 86 and object tracking processor 98 may perform 3D image processing, to reduce the load on a scene processing unit normally associated with a higher level processor, for example ladar system controller 30. There are two modes of data collection, the first being SULAR, or a progressive scan in depth. Each laser pulse typically results in 20 "slices" of data, similar to a CAT scan, and each "slice" may be stored as a single page in the common frame memory 88. With each pixel sampling at a 2 nanosecond interval, the "slices" are each a layer of the image space at roughly 1 foot differences in depth. The 20 slices represent a frame of data, and the sampling for a succeeding laser pulse may be started at 20 feet further in depth, so that the entire image space up to 1000 feet in range or depth, may be swept out in a succession of 50 laser illuminating pulses, each laser pulse response consisting of 20 "slices" of data held in a single frame entry. In some cases, the frame memory may be large enough to hold all 50 frames of data. The number of slices stored could be enough to map out any relevant distance, with no trigger mode operation required. The reduction of the data might then take place in an external computer, as in the case of data taken to map an underwater surface, or a forest with tree cover, or any static landscape, where sophisticated post-processing techniques in software may yield superior accuracy or resolution. A second data acquisition mode is the TRIGGER mode, where the individual pixels each look for a pulse response, and upon a certain pulse threshold criteria being met, the 20 analog samples bracketing the pulse time of arrival are retained in the pixel analog memories, and a running digital counter is frozen with a nominal range measurement. The 20 analog samples are output from each pixel through the "A" and "B" outputs of readout integrated circuit 82, which represent the interleaved row or column values of the 128×128 pixel of the present design. The "A" and "B" outputs are analog outputs, and the analog samples presented there are converted to digital values by the dual channel analog-to-digital (A/D) converter 84. Interleaving the outputs means one of the outputs ("A") reads out the odd numbered lines of the readout IC 82, and the other output ("B") reads out the even numbered lines of the readout IC 82. Larger detector arrays 78 and readout ICs 82 may have more than two analog outputs. The digital outputs of the A/D converters 84 connect to the inputs of the data reduction processor 86. A/D converters 84 may also be integrated into readout integrated circuit 82. The digital outputs are typically 10 or 12 bit digital representations of the uncorrected analog samples measured at each pixel of the readout IC 82, but other representations with greater or fewer bits may be used, depending on the application. The rate of the digital outputs depends upon the frame rate and number of pixels in the array. In TRIGGER mode, a great deal of data reduction has already transpired, since the entire range or depth space may be swept out in the timeframe of a single laser pulse, and the data reduction processor 86 would only operate on the 20 analog samples stored in each unit cell in order to refine the nominal range measurement received from each pixel (unit cell) of the array. The data reduction processor 86 refines the nominal range measurements received from each pixel by curve fitting of the analog samples to the shape of the outgoing laser illuminating pulse, which is preserved by the reference ARC pulse signal. These pulses are typically Gaussian, but may be square, trapezoidal, haversine, sinc function, etc., and the fitting algorithms may employ Fourier analysis, Least Squares analysis, or fitting to polynomials, exponentials, etc. The range measurements may also be refined by curve fitting to a well known reference pulse characteristic shape. In TRIGGER acquisition mode, the frame memory 88 only needs to hold a "point cloud" image for each illuminating laser pulse. The term "point cloud" refers to an image created by the range and intensity of the reflected light pulse as detected by each pixel of the 128×128 array of the present design. In TRIGGER mode, the data reduction processor 86 serves mostly to refine the range and intensity (R&I) measurements made by each pixel prior to passing the R&I data to the frame memory 88 over data bus 87, and no "slice" data or analog samples are retained in memory independently of the R&I "point cloud" data in this acquisition mode. Frame memory 88 provides individual or multiple frames, or full point cloud images, to control processor 58 over data bus 90, and to an optional object tracking processor 98 over data bus 89 as required.

As also shown in FIG. 4, data reduction processor 86 and control processor 58 may be of the same type, a reduced instruction set (RISC) digital processor with hardware implementation of integer and floating point arithmetic units. Object tracking processor 98 may also be of the same type as RISC processors 86 and 58, but may in some cases be a processor with greater capability, suitable for highly complex graphical processing. Object tracking processor 98 may have in addition to hardware implemented integer and floating point arithmetic units, a number of hardware implemented matrix arithmetic functions, including but not limited to; matrix determinant, matrix multiplication, and matrix inversion. In operation, the control processor 58 controls amplifier array 80, readout integrated circuit 82, A/D converters 84, frame memory 88, data reduction processor 86 and object tracking processor 98 through a bidirectional control bus 92 which allows for the master, control processor 58 to pass commands on a priority basis to the dependent peripheral functions; amplifier array 80, readout IC 82, A/D converters 84, frame memory 88, data reduction processor 86, and object tracking processor 98. Bidirectional control bus 92 also serves to return status and process parameter data to control processor 58 from amplifier array 80, readout IC 82, A/D converters 84, frame memory 88, data reduction processor 86, and object tracking processor 98. Data reduction processor 86 refines the nominal range data and adjusts each pixel intensity data developed from the digitized analog samples received from A/D converters 84, and outputs a full image frame via unidirectional data bus 87 to frame memory 88, which is a dual port memory having the capacity of holding several frames to several thousands of frames, depending on the application. Object tracking processor 98 has internal memory with sufficient capacity to hold multiple frames of image data, allowing for multi-frame synthesis processes, including video compression, single frame or multi-frame resolution enhancement, statistical processing, and object identification and tracking. The outputs of object tracking processor 98 are transmitted through unidirectional data bus 99 to a communications port 60, which may be resident on control processor 58. All slice data, range and intensity data, control, and communications then pass between communications port 60 and a centralized ladar system controller 30, (FIG. 3) through bidirectional connections 26. Power and ground connections (not shown) may be supplied through an electromechanical interface. Bidirectional connections 26 may be electrical or optical transmission lines, and the electromechanical interface may be a DB-25 electrical connector, or a hybrid optical and electrical connector, or a special automotive connector configured to carry signals bidirectionally for the ladar sensor 34. Bidirectional connections 26 also would connect to ladar system controller 30 in the case of an auxiliary lamp assembly which may have a short range ladar sensor 32 embedded therein. Bidirectional connections 26 may be high speed serial connections such as Ethernet, Universal Serial Bus (USB), or Fibre Channel, or may also be parallel high speed connections such as Infiniband, etc., or may be a combination of high speed serial and parallel connections, without limitation to those listed here. Bidirectional connections 26 also serve to upload information to control processor 58, including program updates for data reduction processor 86, object tracking processor 98, and global position reference data, as well as application specific control parameters for the remainder of the ladar sensor 34 functional blocks. Inertial and vertical reference 50 (see FIG. 3) also provides data to the short range ladar sensors 32 and long range ladar sensors 34 from the host vehicle 2 through the vehicle electrical systems and CPU 48 and the ladar system controller 30 as needed. Likewise, any other data from the host vehicle 2 which may be useful to the ladar sensor 34 may be provided in the same manner as the inertial and vertical reference data. Inertial and vertical reference data may be utilized in addition to external position references by control processor 58, which may pass position and inertial reference data to data reduction processor 86 for adjustment of range and intensity data, and to object tracking processor 98 for utilization in multi-frame data synthesis processes. The vertical reference commonly provides for measurement of pitch and roll, and is adapted to readout an elevation angle, and a twist angle (analogous to roll) with respect to a horizontal plane surface normal to the force of gravity. The short range ladar sensors 32 typically employ a semiconductor laser, which may be modulated in several different ways. The long range ladar sensors 34 typically employ a q-switched solid state laser, which produces a single output pulse with a Gaussian profile. The pulse shape of a solid state laser of this type is not easily modulated, and therefore must be dealt with "as is" by the receiver section of a long range ladar sensor 34. The operations of short range ladar sensors 32 of the type which are typically embedded in an auxiliary lamp assembly such as a taillight, turn signal, or parking light are the same as the operations of the long range ladar sensors 34 with some exceptions. The long range ladar sensors 34 and short range ladar sensors 32 may differ only in the type of laser employed and the type of laser modulation. The transmit optics 72 and receive optics 74 may also differ, owing to the narrower angular field of view for the long range ladar sensors 34. Differences in the transmitted laser pulse modulation between the long range ladar sensors 34 and short range ladar sensors 32 may be accommodated by the flexible nature of the readout IC 82 sampling modes, and the data reduction processor 86 programmability. The host vehicle 2 may have a number of connector receptacles generally available for receiving mating connector plugs from USB, Ethernet, RJ-45, or other interface connection, and which may alternatively be used to attach long range ladar sensors 34 or short range ladar sensors 32 of the type described herein.

Continuing with FIG. 4, it is useful to discuss a short range ladar sensor 32 variant. In a short range ladar sensor 32, considerably less transmit power is required, allowing for the use of a semiconductor laser and multi-pulse modulation schemes. One example of a semiconductor laser is the vertical cavity surface emitting laser (VCSEL), used in a preferred embodiment because of a number of preferential characteristics. A VCSEL typically has a circular beam profile, and has lower peak power densities at the aperture. VCSELs also require fewer secondary mechanical operations, such as cleaving, polishing, etc., and may be formed into arrays quite easily. The use of a semiconductor laser allows for the tailoring of a drive current pulse so as to produce a Gaussian optical pulse shape with only slight deviations. The VCSEL response time is in the sub-nanosecond regime, and the typical pulse optical width might be 5-100 nanoseconds at the half power points. In the diagram of FIG. 4, the VCSEL and laser driver would be part of the pulsed laser transmitter 68, and the desired pulse or waveshape is itself produced by a digital-to-analog converter 66 which has a typical conversion rate of 200-300 MHz, so any deviations in the output pulse shape from the Gaussian ideal may be compensated for in the lookup table in memory 64 associated with control processor 58, which serves as the digital reference for the drive current waveform supplied to the laser driver within pulsed laser transmitter 68 by the D/A converter. A Gaussian single pulse modulation scheme works well at short ranges, given the limited optical power available from a VCSEL. Extending the range of a VCSEL transmitter may be done using more sophisticated modulation schemes such as multi-pulse sequences, sinewave bursts, etc. The VCSEL and modulation schemes as described herein with reference to short range ladar sensor 32 are an alternative to the solid state laser typically used in a pulsed laser transmitter 68 of a long range ladar sensor 34. The use of a VCSEL array in pulsed laser transmitter 68 has the potential to reduce cost, size, power consumption, and/or enhance reliability. Ladar sensors may be mounted at many points on the vehicle 2; headlamps, auxiliary lamps, door panels, rear view mirrors, bumpers, etc. When equipped with a more sensitive detector array 78 such as an image tube FPA, a ladar sensor of the type described herein may use a VCSEL array as an illuminating source, and much longer ranges may be supported. When referring to the major functions of the ladar sensor of FIG. 4, it is sometimes convenient to refer to the "optical transmitter" as those functions which support and/or create the burst of light for illuminating the scene in the field of view. These elements would typically be the control processor 58 which starts the process, pulsed laser transmitter 68, beam steering mechanism 70, and transmit optics 72. The term "optical receiver" may be used to refer to those elements necessary to collect the light reflected from the scene in the field of view, filter the received light, convert the received light into a plurality of pixellated electrical signals, amplify these pixellated electrical signals, detect the pulses or modulation thereon, perform the range measurements, and refine or reduce the received data. These functions would include the receive optics 74, optical gain block 76, detector array 78, amplifier array 80, readout IC 82, A/D converters 84, and the data reduction processor 86.

Figure 5:
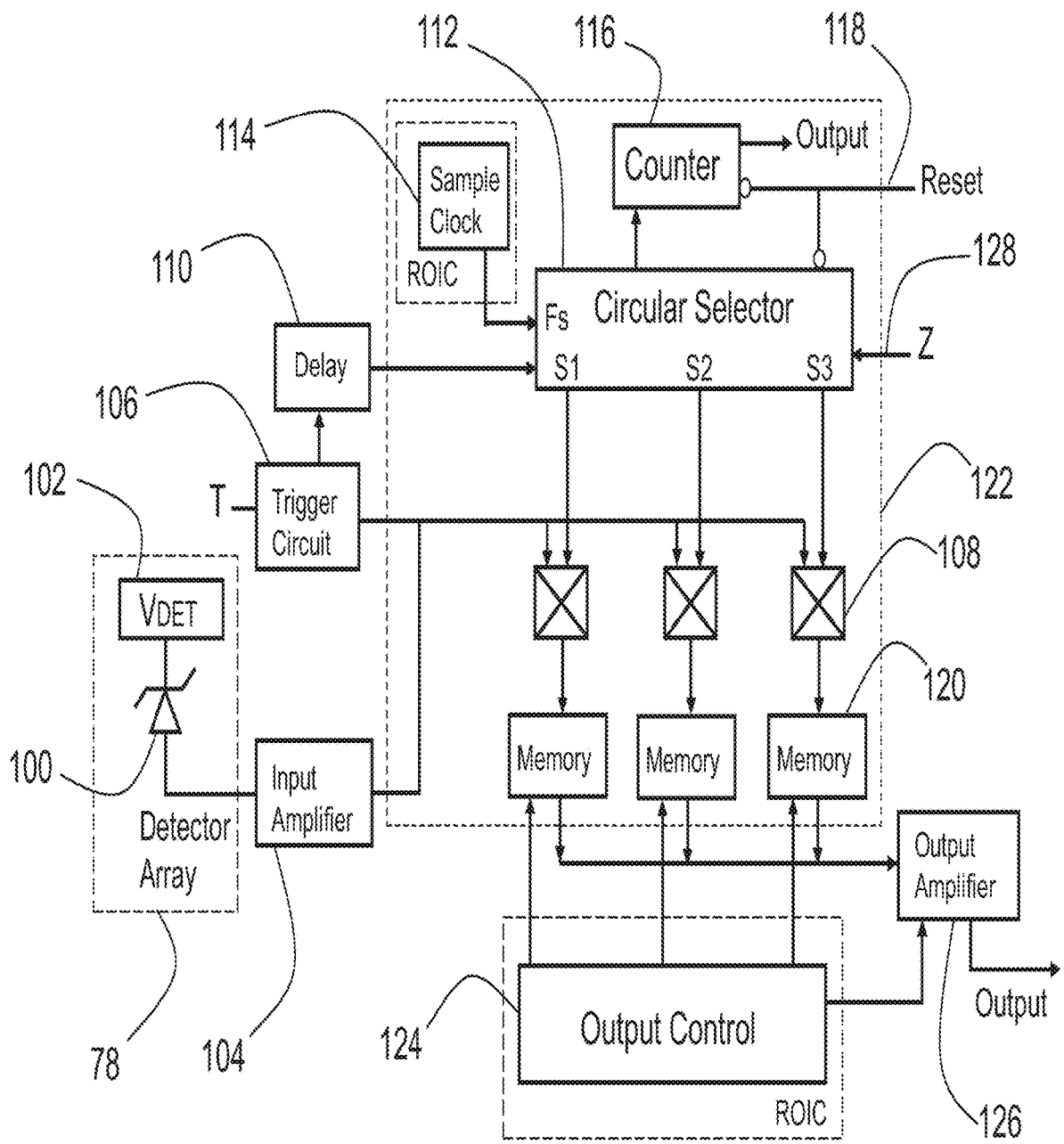
FIG. 5 is a block diagram of a unit cell of the readout integrated circuit (ROIC) of FIG. 4.

The unit cell electronics depicted in FIG. 5 is well adapted to work with a Gaussian single pulse modulation scheme, and works advantageously with other modulation schemes as well, including sequences of flat-topped pulses, Gaussian, or otherwise shaped pulses. These pulses may be of varying width and spacing, in order to reduce range ambiguities, and may also be random pulse sequences, or in other cases, Barker coded pulse sequences. In the typical operation of a short range ladar sensor 32 having a semiconductor laser producing a single Gaussian output pulse, some portion of the pulsed laser light reflected from a surface in the field of view of the short range ladar sensor 32 is concentrated and focused by receive optics 74, passes through optical gain block 76, and falls on an individual detector element 100 of detector array 78. The individual element 100 is typically an avalanche photodiode, but may be a PIN or NIP, or other structure. Each individual element 100 of detector array 78 is formed in a semiconducting film comprised of silicon, indium gallium arsenide, indium gallium arsenide phosphide, aluminum gallium arsenide, indium gallium nitride, or other semiconducting compound appropriate to the wavelength of operation. Each individual element 100 is biased with a voltage by a bias voltage distribution network VDET 102. The reflected light signal incident upon the individual detector element 100 is converted to an electronic signal, typically a photocurrent, and amplified by input amplifier 104, typically a transimpedance amplifier. The output of input amplifier 104 is distributed to a trigger circuit 106 as well as a number of analog sampling gates 108. Each analog sampling gate 108 has an output connected to an analog memory cell 120. The trigger circuit 106 is typically a threshold voltage comparator, set to trigger when a pulse is received which exceeds a predetermined magnitude, though other pulse detection schemes may be used. After a programmable delay through delay circuit 110, the state of circular selector 112 is frozen by the logic transition of trigger circuit 106 output if the unit cell is being operated in TRIGGER mode. Prior to the detection of a received pulse by trigger circuit 106, the sample clock 114 causes the state of circular selector 112 to advance, enabling one of the sampling control outputs S1-S3, which in turn causes a sampling of the input amplifier 104 output by one of the sampling gates 108. The number of transitions of sample clock 114 is counted by counter 116, as the circular selector 112 outputs a logic transition to counter 116 for every cycle of the sampling clock after the release of the active low reset line 118. Circular selector 112 may cycle through outputs S1-S3 in order, or may have a different sequence, depending on the programming. A second circular selector 112, and sample clock 114 may operate in parallel, along with counter 116, analog sampling gates 108 and analog memory cells 120. The combination of sample clock 114, counter 116, circular selector 112, sampling gates 108, and memory cells 120 may be termed a unit cell sampling structure 122, indicated by the short dashed line border. Two, three, or more of these sampling structures 122 may be operated in parallel on the output of input amplifier 104, with the advantages of such a structure to be described later in regards to range ambiguity. Shown in FIG. 5 are three sampling gates 108, and analog memory cells 120, but the number may be several hundred or more on some readout ICs 82. Once all of the analog sample data has been taken, a control command from the control processor 58 initiates a readout cycle by activating output control 124 and output amplifier 126 to readout the contents of the analog memory cells 120 in a predetermined order.

In a typical short range ladar sensor 32, and assuming a 1 cm$^2$ VCSEL array with a 5 kW/cm$^2$ power density, and depending upon the reflectivity of the objects in the field of view, and the responsivity and excess noise of the detector array 78, the effective range of a Gaussian single pulse modulation scheme might be in the range of 10-20 meters, using a simple threshold detection technique. Without resorting to a large VCSEL array, which might be expensive and might require a large discharge capacitor to supply a large current pulse, more sophisticated modulation and detection techniques can be used to create additional processing gains, to effectively increase the signal-to-noise ratio, and thus extend the range of the short range ladar sensor 32 without requiring an increase in peak power. In a first modulation scheme, which produces a Gaussian single pulse modulation, a detection technique may be employed which uses the digitized analog samples from each unit cell electrical circuit, and processes these samples in a digital matched filter to find the centroid of the received pulse, resulting in significant processing gain. The processing gains resulting from this structure are proportional to the square root of the number of samples used in the filtering algorithm. For example, a unit cell electrical circuit with 256 analog memory cells 120 could yield a processing gain of 16 if all the available analog samples were used in a matched filter algorithm, assuming Gaussian single pulse modulation, and a normal noise distribution. The term "processing gain" is used here to describe the increase in effective signal-to-noise ratio (SNR) realized by performing the described operations on the voltage samples. Assuming the pulsed laser light is distributed uniformly over just the field of view of the receive optics 74, the effective range of the ladar also increases as the square root of the transmitted power (or SNR), and an increase in range to 40-80 meters could be the result. Single pulse Gaussian modulation may be characteristic of either a solid state laser or a semiconductor laser with a simple driver, and thus may be an attribute of either a long range ladar sensor 34 or a short range ladar sensor 32.

The unit cell electronic circuit of FIG. 5 is well adapted to single pulse modulation, or to more complex modulation scenarios. In a second modulation scheme, a VCSEL array modulated with a series of Barker encoded flat-topped or Gaussian pulses can be sampled by the unit cell electronics of FIG. 5 and analyzed by data reduction processor 86 for range and intensity estimates. In a third modulation scheme, a VCSEL array modulated with a pulsed sinewave allows for greater cumulative energy to be reflected from a feature in a scene in the field of view of either a short range ladar sensor 32 or a long range ladar sensor 34 without an increase in peak power. Each peak of a pulsed sinewave will have a separate reflection from an object or feature in the scene in the field of view of the ladar sensor 52 and the unit cell electrical circuit of FIG. 5 allows the ladar sensor receiver to respond to the cumulative energy from many of these reflected pulses using a minimum of circuitry. The waveform in a preferred embodiment is a number of sinewave cycles, and the number could be quite large, depending on a number of factors. The receiver circuitry of the unit cell electronics shown in FIG. 5 is capable of sampling or of synchronously detecting the cumulative energy of the returned pulse peaks. Two sampling modes may be supported by the unit cell sampling structure shown in FIG. 5. When taking analog samples of single pulse or multi pulse sequences, wherein analog samples of an incoming waveform are being sequentially taken, the sampling impedance control 128 (Z) to the circular selector 112 would be set to a minimum value. The sampling frequency of sample clock 114 would also be selected to produce 10 or perhaps 20, analog samples during each pulse width. When the sampling impedance control 128 is set to a minimum, the sample controls S1, S2, S3 turn on with full voltage during a sampling cycle. Since each sampling gate 108 is a field effect transistor, increasing the sample control voltage S1-S3 will increase the gate-source voltage on the sampling FET, thus lowering the impedance of the channel between source and drain, and setting the sampling gate impedance to a minimum. When the sampling gate 108 impedance is set to a minimum, the storage capacitor serving as analog memory cell 120 charges rapidly to the voltage present at the output of input amplifier 104. This mode can be termed "instantaneous voltage sampling" to distinguish the mode from a second sampling mode, which is selected when the sampling impedance control 128 is set to a higher, or even maximum value. When the sampling impedance control 128 is selected for high impedance, or maximum series resistance value, the outputs S1-S3 would be at or near minimum voltages when enabled, resulting in a lower gate-source voltage across each of the sampling gate FETs 108, and thus a higher sampling gate series resistance in the channel between source and drain of each sampling gate 108 FET. With the series resistance of the sampling gates 108 set to high or maximum value, the effect is to cause an R-C filter to develop, with the analog memory cell 120 storage capacitor performing as an integrating capacitor. This second sampling mode may be very useful when a sinusoidal modulation is applied to the pulsed laser transmitter 68 in the case where the laser is a semiconductor laser, typically a high efficiency VCSEL. By applying a sampling clock to the sampling gate 108 driven by S1, and which is the same frequency as the sinusoidal modulation, a sum frequency and a difference frequency will be in the sampled signal, and the analog memory cell 120 storage capacitor will filter out the sum frequency, and the difference frequency will be zero, leaving only a DC voltage component, which will be a trigonometric function of the phase difference. Over a number of cycles of the sinusoidal modulation from the output of input amplifier 104, this DC voltage will emerge as the sine or cosine of the phase difference between the transmitted and received waveforms. This phase difference is proportional to the range to a reflecting surface. To improve the processing gain, the second sampling gate driven by the S2 signal is driven by the same sampling clock frequency, but shifted by 90 degrees in phase, and the greater of the two DC voltages, or a ratio of the two voltages, may be used to estimate phase, and thereby range. Typically, a ratio is preferred, as it removes the variation in amplitude of the incoming sinewave as an error term. This type of detection relies on "In-phase" and "Quadrature-phase" local references, and is often referred to as an "I&Q" detection scheme. Thus, the sampling gates 108 can be operated as instantaneous voltage samplers in a first sampling mode, or as frequency mixers in a second sampling mode, depending on the state of the sampling impedance control 128, and the frequency applied by sampling clock 114. In the first sampling mode, the shape of a pulse or sequence of pulses may be acquired, and in second sampling mode, a periodic waveform modulation such as a sinewave, may be demodulated through the frequency mixing effect and integration on a storage capacitor, resulting in a phase measurement and thereby range. Demodulation within the unit cell electrical circuit reduces the data at an early point, reducing the requirements for memory and fast digital processors. Alternatively, the demodulation of a sinewave or other periodic waveform may be performed in data reduction processor 86 on the digitized representations of the analog samples, given a fast arithmetic unit, and the proper algorithm. This illustrates the power and flexibility of the instantaneous voltage sampling mode, as the data reduction processor 86 can be adapted to run PWD, CSC, FIR filter, IIR filter, I&Q, or any number of curve fitting algorithms to increase SNR, measure phase, or otherwise reduce range measurement errors.

Figure 6A:
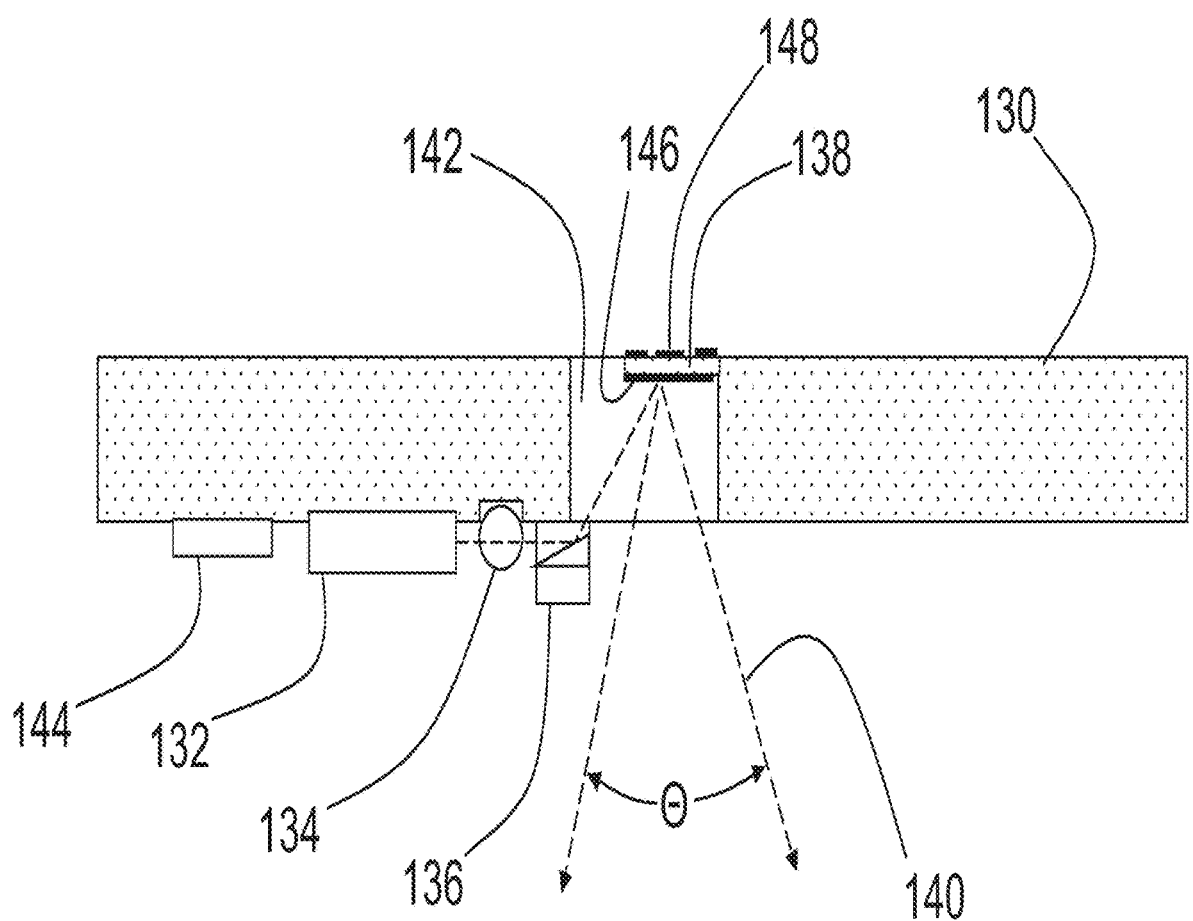
FIG. 6A is a cutaway side view of a beam steering mechanism featuring an edge emitting laser, a fixed mirror angle block, and a MEMS style micro mirror capable of deflection in two axes.

FIG. 6A shows a central section view of a preferred embodiment of the pulsed laser transmitter 68, flash detector 67, and beam steering mechanism 70. A silicon substrate 130 is processed via photolithography and MEMS fabrication techniques to have a cavity 142, cantilevered bending element 138, and two recessed sections for mounting an edge emitting laser 132, and a beam conditioning lens 134. Beam conditioning lens 134 is typically a ball lens or a rod lens, but may be of another type useful for circularizing and/or collimating the elliptical output beam of edge emitting laser 132. An angle block 136 is used to redirect the conditioned output beam of edge emitting laser 132 onto the mirror surface 146 of bending element 138. Mirror surface 146 may be gold, silver, aluminum, nickel, titanium, or other reflective metal, and may be a stack of several metal films. Mirror surface 146 may also be a multi layer dielectric reflector formed of silicon dioxide, silicon nitride, sapphire, calcium fluoride, or other suitable dielectric film. In operation, a differential voltage is applied between interdigital contacts 148 to cause piezoelectric strain on the reverse side of bending element 138. If the piezoelectric strain is compressive, the bending element 138 will bend up (above the top surface of substrate 130). If the piezoelectric strain is tensile, the bending element 138 will deflect down towards the interior of cavity 142. Depending on the sign of the differential voltage imposed on interdigital contacts 148, the strain will be compressive or tensile. In this manner, the output optical beam 140 may be swept through an angle θ as shown in the diagram. The angle θ is typically in the range of 17 degrees, and may be swept out in less than a millisecond, and in some cases, less than 100 microseconds, depending on the particulars of the design. At the rear of edge emitting laser 132 is an edge detecting PIN diode 144 placed as an optical power detector to intercept the fractional power transmitted through the back facet of edge emitting laser 132. The pulsed laser transmitter 68 has a number of other components besides laser 132, including an electrical drive circuit, and electronic interface to the control processor 58. These circuits are not shown here, but have been described in other publications. Likewise, the flash detector 67 has other components than PIN diode 144, including an electrical amplifier and threshold detection circuit. These circuits have been described in detail in other publications as well, and are peripheral to the instant invention.

Figure 6B:
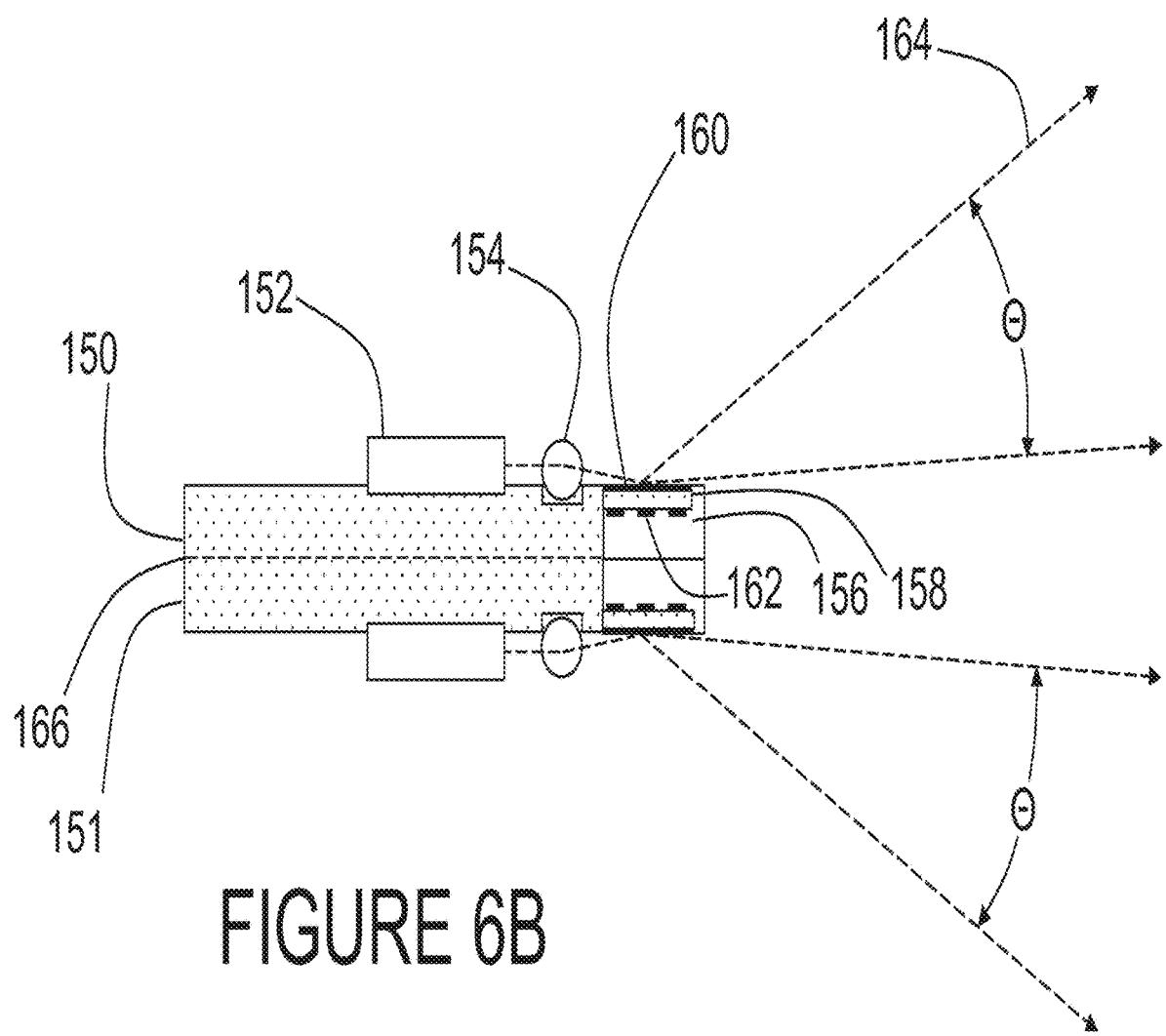
FIG. 6B is a cutaway side view of a beam steering mechanism featuring two edge emitting lasers, two rod lenses, and two MEMS style micro mirrors capable of deflection in two axes.

FIG. 6B shows a central section view of a second embodiment of beam steering mechanism 70. Several embodiments of the beam steering mechanism 70 are anticipated, and each is described in association with a FIGS. 6A, 6B, 6C, and 6D. The operating mode of the beam steering mechanism 70 will be then described in connection with the operations of the ladar sensor (32, 34). A silicon substrate 150 is processed via photolithography and MEMS fabrication techniques to have a cavity 156, cantilevered bending element 158, and two recessed sections for mounting an edge emitting laser 152, and a beam conditioning lens 154 on a first surface. Beam conditioning lens 154 is typically a ball lens or a rod lens, but may be of another type useful for circularizing and/or collimating the elliptical output beam of edge emitting laser 152. The output beam of edge emitting laser 152 is directed by lens 154 to fall on the mirror surface 160 of bending element 158. Mirror surface 160 may be gold, silver, aluminum, nickel, titanium, or other reflective metal, and may be a stack of several metal films. Mirror surface 160 may also be a multi layer dielectric reflector formed of silicon dioxide, silicon nitride, sapphire, calcium fluoride, or other suitable dielectric film. In operation, a differential voltage is applied between interdigital contacts 162 to cause piezoelectric strain on the reverse side of bending element 158. If the piezoelectric strain is tensile, the bending element 158 will bend up (above the top surface of substrate 150). If the piezoelectric strain is compressive, the bending element 158 will deflect down towards the interior of cavity 156. Depending on the sign of the differential voltage imposed on interdigital contacts 162, the strain will be compressive or tensile. In this manner, the output optical beam 164 may be swept through an angle θ as shown in the diagram. The angle θ is typically in the range of 17 degrees, and may be swept out in less than a millisecond, and in some cases, less than 100 microseconds, depending on the particulars of the design. A complementary structure may be formed on the reverse side of substrate 150 in the same manner, and the identical structure used in combination with the structure on the first surface to sweep out an angle 2θ which would then be in the range of 34 degrees. In some cases, the structure on the reverse side of substrate 150 is formed by assembling together two similar MEMS substrates 150 and 151, by wafer bonding or other processes. A knit line 166 is shown where the two substrates 150 and 151 are joined.

Figure 6C:
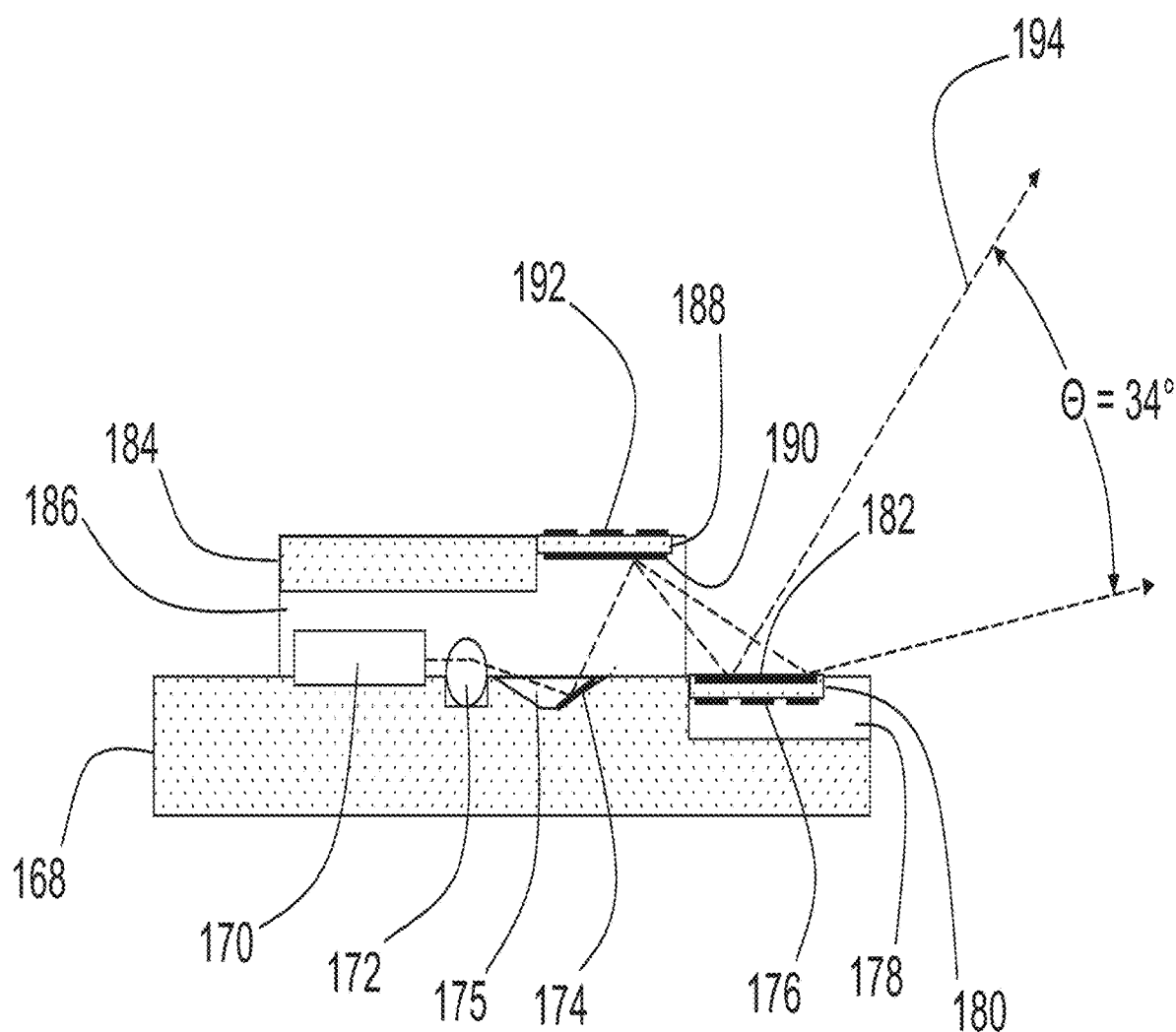
FIG. 6C is a cutaway side view of a beam steering mechanism featuring an edge emitting laser, a rod lens, and a cascade of two MEMS style micro mirrors capable of deflection in two axes.

FIG. 6C shows a central section view of a third embodiment of beam steering mechanism 70. A first silicon substrate 168 is processed via photolithography and MEMS fabrication techniques to have a cavity 178, and a first cantilevered bending element 180, and two recessed sections for mounting an edge emitting laser 170, and a beam conditioning lens 172 on the top surface. A third recessed section 175 is formed by MEMS techniques, such as chemical mechanical polishing. Recessed section 175 has an angled profile on the sidewalls, and a mirrored surface 174. Beam conditioning lens 172 is offset vertically from the centerline of the output beam of laser 170, and redirects the beam onto mirrored surface 174. Beam conditioning lens 172 is typically a ball lens or a rod lens, but may be of another type useful for circularizing and/or collimating the elliptical output beam of edge emitting laser 170. The optical beam is then directed against the mirror surface 190 of a second bending element 188. Second bending element 188 is formed in a second silicon substrate 184 which has a cavity 186 formed therein by MEMS processes. Second silicon substrate 184 is positioned atop first silicon substrate 168 and bonded. The bonding process may involve adhesive, epoxy, or other chemical/physical means of surface activation. Mirror surface 190 may be gold, silver, aluminum, nickel, titanium, or other reflective metal, and may be a stack of several metal films. Mirror surface 190 may also be a multi layer dielectric reflector formed of silicon dioxide, silicon nitride, sapphire, calcium fluoride, or other suitable dielectric film. In operation, a differential voltage is applied between interdigital contacts 192 to cause piezoelectric strain on the reverse side of second bending element 188. If the piezoelectric strain is compressive, the bending element 188 will bend up (above the top surface of second silicon substrate 184). If the piezoelectric strain is tensile, the bending element 188 will deflect down towards the interior of cavity 186. Depending on the sign of the differential voltage imposed on interdigital contacts 192, the strain will be compressive or tensile. In this manner, the output optical beam 194 may be swept through an angle of about 17 degrees as shown in the diagram. The output beam directed by second bending element 188 is then incident upon the mirrored surface 182 of first bending element 180. In operation, a differential voltage is applied between interdigital contacts 176 to cause piezoelectric strain on the reverse side of first bending element 180. If the piezoelectric strain is tensile, the bending element 180 will bend up (above the top surface of silicon substrate 168). If the piezoelectric strain is compressive, the bending element 180 will deflect down towards the interior of cavity 178. Depending on the sign of the differential voltage imposed on interdigital contacts 176, the strain will be compressive or tensile. In this manner, the output optical beam 194 may be swept through an angle θ in the range of 34 degrees, due to the cascade of the two MEMs bending elements. The angle θ may be swept out in less than a millisecond, and in some cases, less than 100 microseconds, depending on the particulars of the design.

Figure 6D:
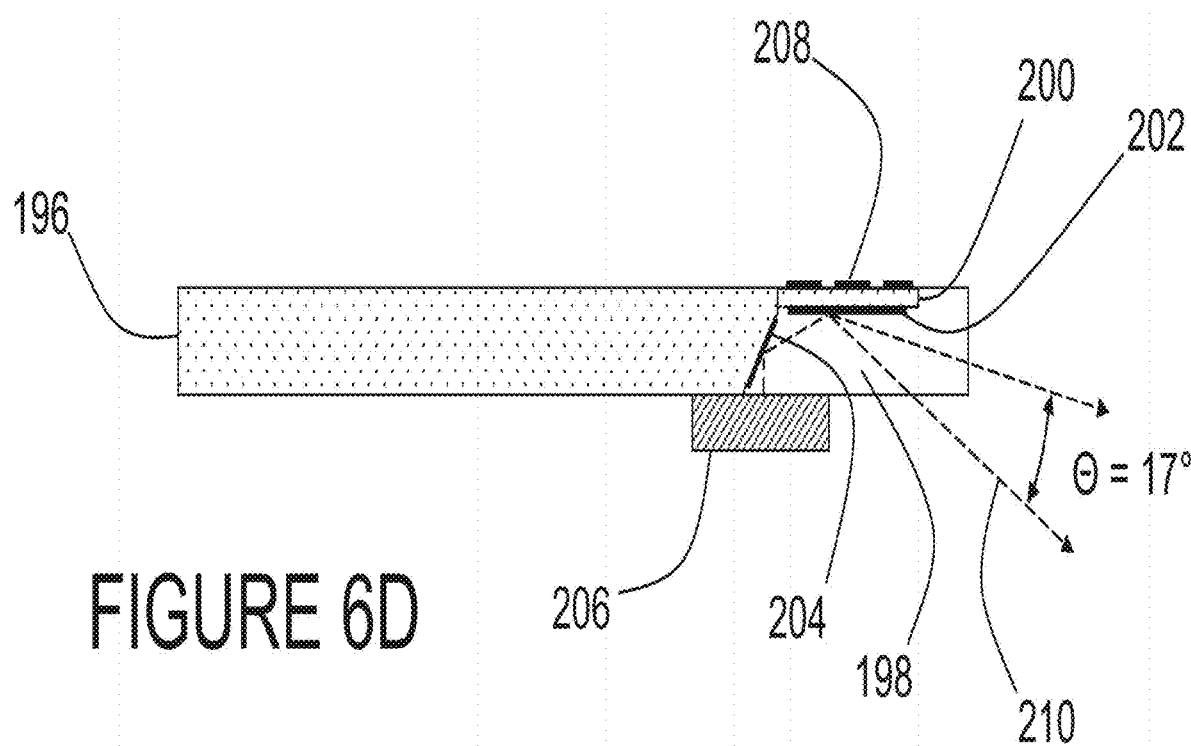
FIG. 6D is a cutaway side view of a beam steering mechanism featuring a vertical cavity surface emitting laser, a silicon substrate, and a MEMS style micro mirror capable of deflection in two axes.

FIG. 6D shows a central section view of a fourth embodiment of beam steering mechanism 70. A silicon substrate 196 is processed via photolithography and MEMs fabrication techniques to have a cavity 198, cantilevered bending element 200, and an angled mirror surface 204. A vertical cavity surface emitting laser (VCSEL) 206 is mounted to the bottom surface of silicon substrate 196. The output beam of VCSEL laser 206 is typically circular, and does not normally need to be conditioned, but may have a focusing and/or collimating lens positioned in front of the beam in some designs. The VCSEL laser 206 optical output beam is directed by angled mirror surface 204 to fall on the mirror surface 202 of bending element 200. Mirror surfaces 202, 204 may be gold, silver, aluminum, nickel, titanium, or other reflective metal, and may be a stack of several metal films. Mirror surfaces 202, 204 may also be a multi layer dielectric reflector formed of silicon dioxide, silicon nitride, sapphire, calcium fluoride, or other suitable dielectric film. In operation, a differential voltage is applied between interdigital contacts 208 to cause piezoelectric strain on the reverse side of bending element 200. If the piezoelectric strain is compressive, the bending element 200 will bend up (above the top surface of substrate 196). If the piezoelectric strain is tensile, the bending element 200 will deflect down towards the interior of cavity 198. Depending on the sign of the differential voltage imposed on interdigital contacts 208, the strain will be compressive or tensile. In this manner, the output optical beam 210 may be swept through an angle θ as shown in the diagram. The angle θ is typically in the range of 17 degrees, and may be swept out in less than a millisecond, and in some cases, less than 100 microseconds, depending on the particulars of the design.

Figure 6E:
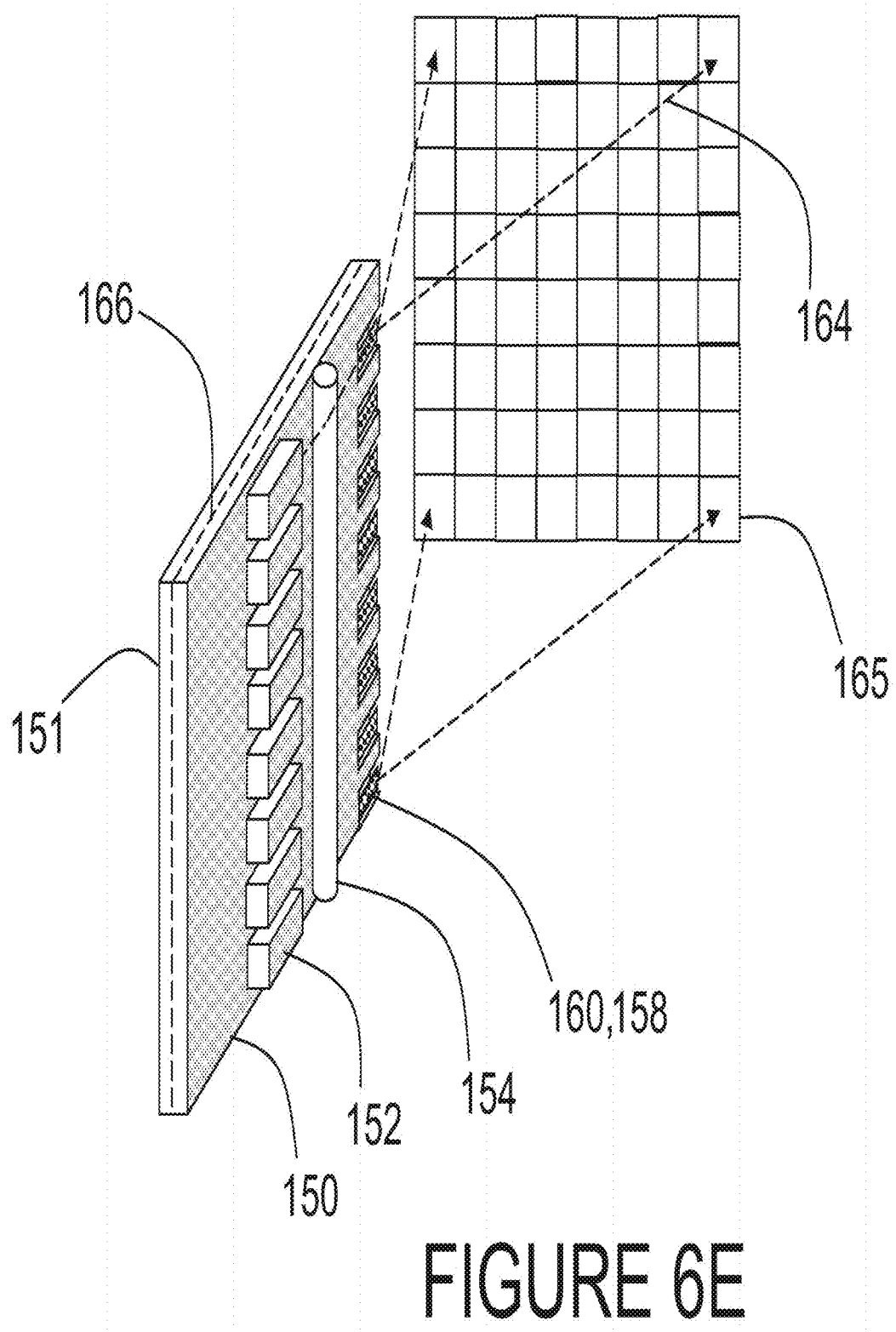
FIG. 6E shows an isometric view of the structure shown in FIG. 6B, and the pixellated far field pattern which will be swept by the pulsed laser transmitter.

FIG. 6E shows an isometric view of the structure shown in FIG. 6B, and the pixellated far field pattern 165 which will be swept by the pulsed laser transmitter 68. In operation, the advantages of the beam steering mechanism 70 allow for a much lower peak power requirement for pulsed laser transmitter 68. Shown here is a 1×8 line array of edge emitting lasers 152 mounted on first substrate 150, a rod lens 154, and bending elements 158 having mirrored surfaces 160. An 8×8 far field pattern 165 is shown here for simplicity. In effect, the entire energy 164 of each edge emitting laser 152 may be directed to a single pixel in the field of view of the ladar sensor (32, 34). Each pixel subtends a certain solid angle, and the purpose of the pulsed laser transmitter 68 is to illuminate the pixel in the field of view, and the ladar sensor will calculate the range to each pixel thus illuminated. In the case of a solid state laser such as neodymium YAG erbium glass, the illuminating energy will be delivered in one giant pulse, and the entire far field 165 must be illuminated. A typical detector array is a square array of 128×128 pixels, for a total of 16,384. In the case of a 1 mJ laser, this would mean about 61 uJ delivered to each pixel in the far field. The advantage of the steerable laser transmitter is shown by this example. A 61 uJ semiconductor laser is well within the realm of possibility, whereas a 1 mJ semiconductor laser would be quite impractical given the current state of the technology. A similar structure (not shown) is assembled on the reverse side on second substrate 151, which can effectively double the width of the illuminated space 165.

Figure 7A:
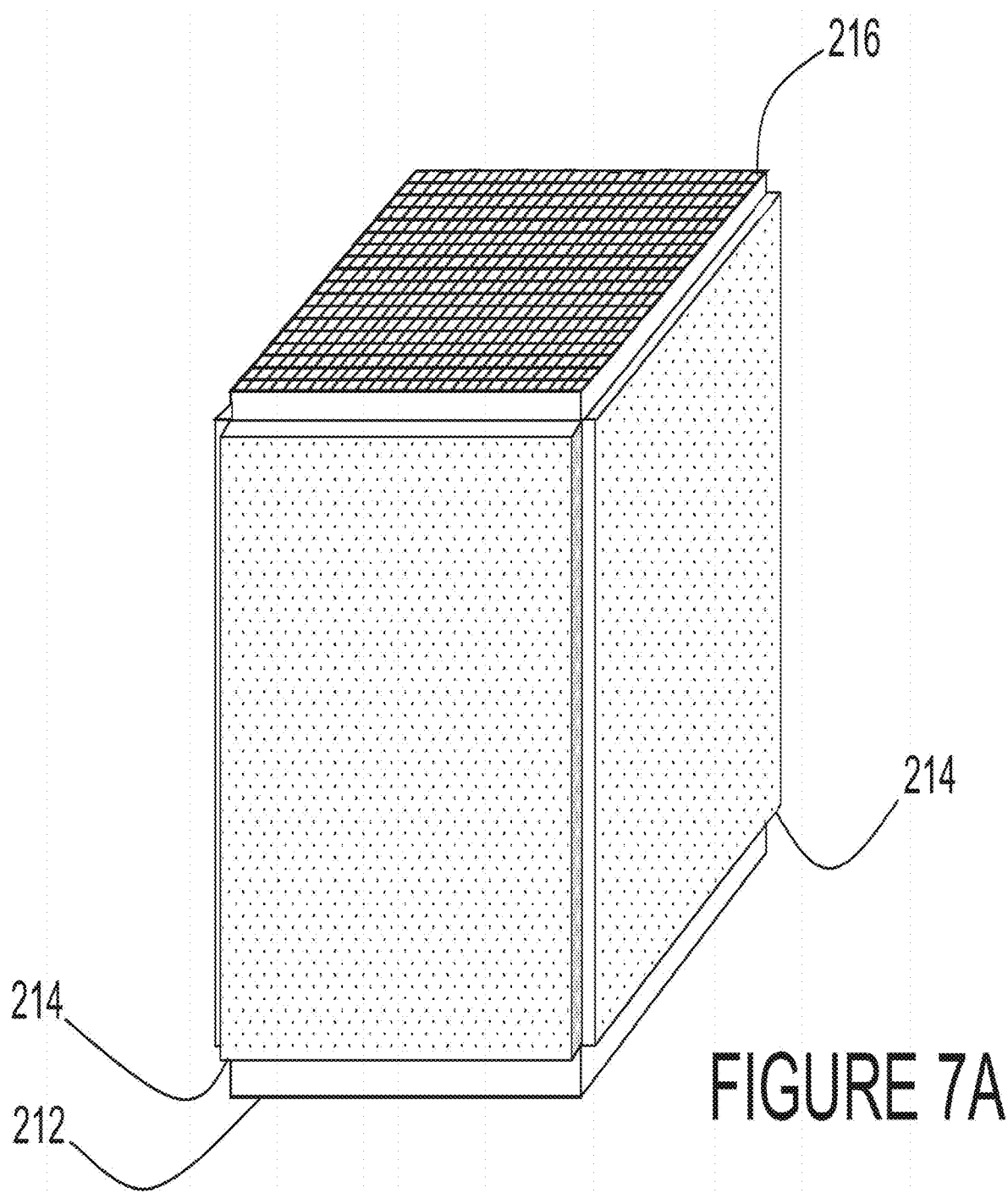
FIG. 7A is an isometric view of an optical gain block showing a fused fiber bundle of erbium doped fibers with a diffusing optical flat bonded to each of four sides.

FIG. 7A shows an isometric view of an optical gain block 76 which may be positioned in the ladar sensor receive path to amplify weak optical return signals which are reflected from distant or low reflectance objects in the field of view. In this case, the optical gain block comprises a rectangular fused fiber bundle 212, which is created from a number of individual erbium doped fibers 216. A diffuser plate 214 is bonded to each of the four sides, which will be illuminated by a pump laser diode array.

Figure 7B:
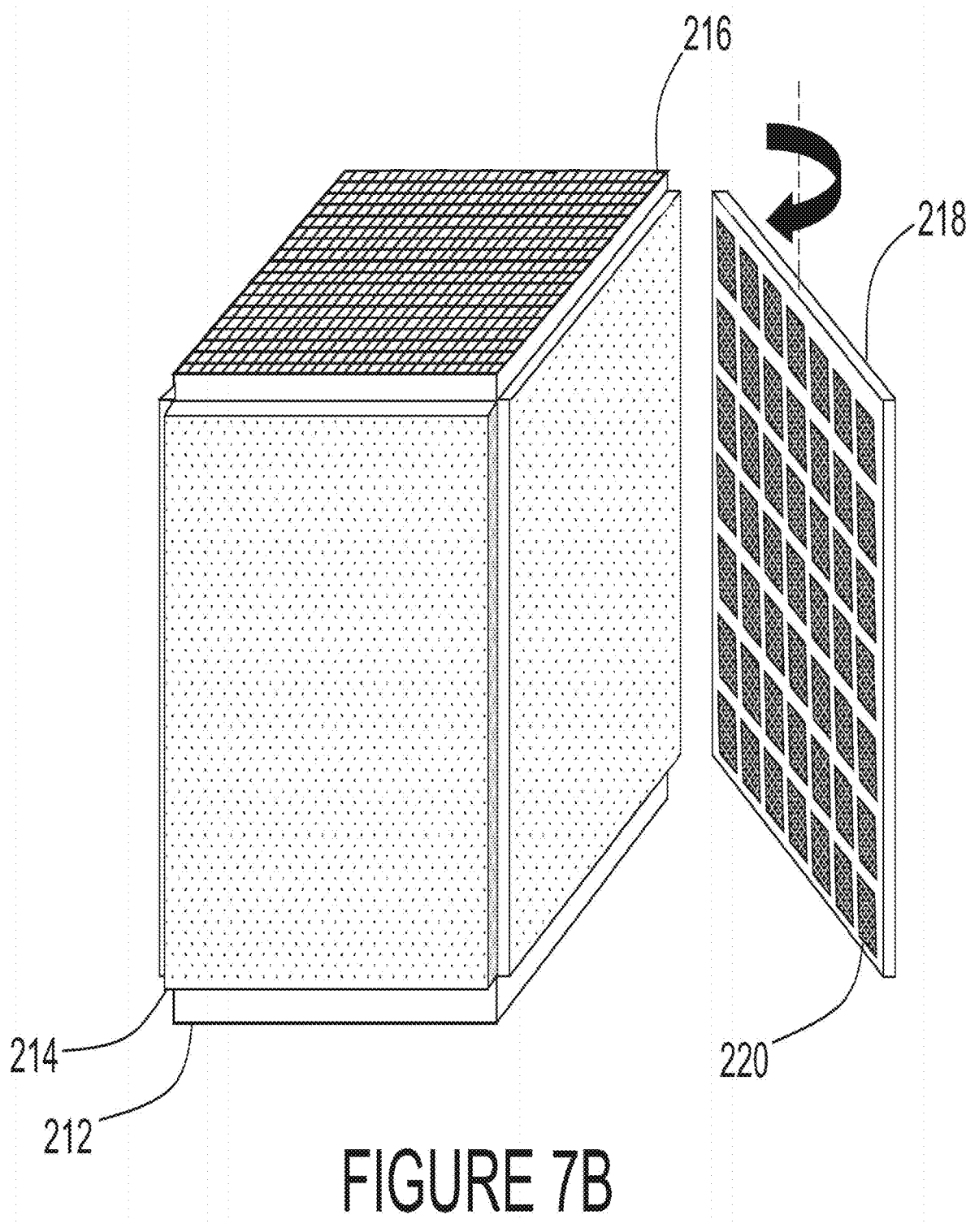
FIG. 7B is an isometric view of an optical gain block showing the assembly of an array of vertical cavity surface emitting lasers (VCSEL) to one of four sides.

FIG. 7B shows an isometric view of the assembly of optical gain block 76. A pump laser VCSEL array 218 comprised of a number of VCSEL lasers 220 is being bonded to the sub-assembly of fused fiber bundle 212 and diffuser plates 214. Incoming reflected light enters each erbium doped fiber 216 of the fused fiber bundle 212 at an exposed endface. The fiber cross section is shown here as rectangular or square, but other fiber cross sections may be used which are hexagonal, circular, etc.

Figure 7C:
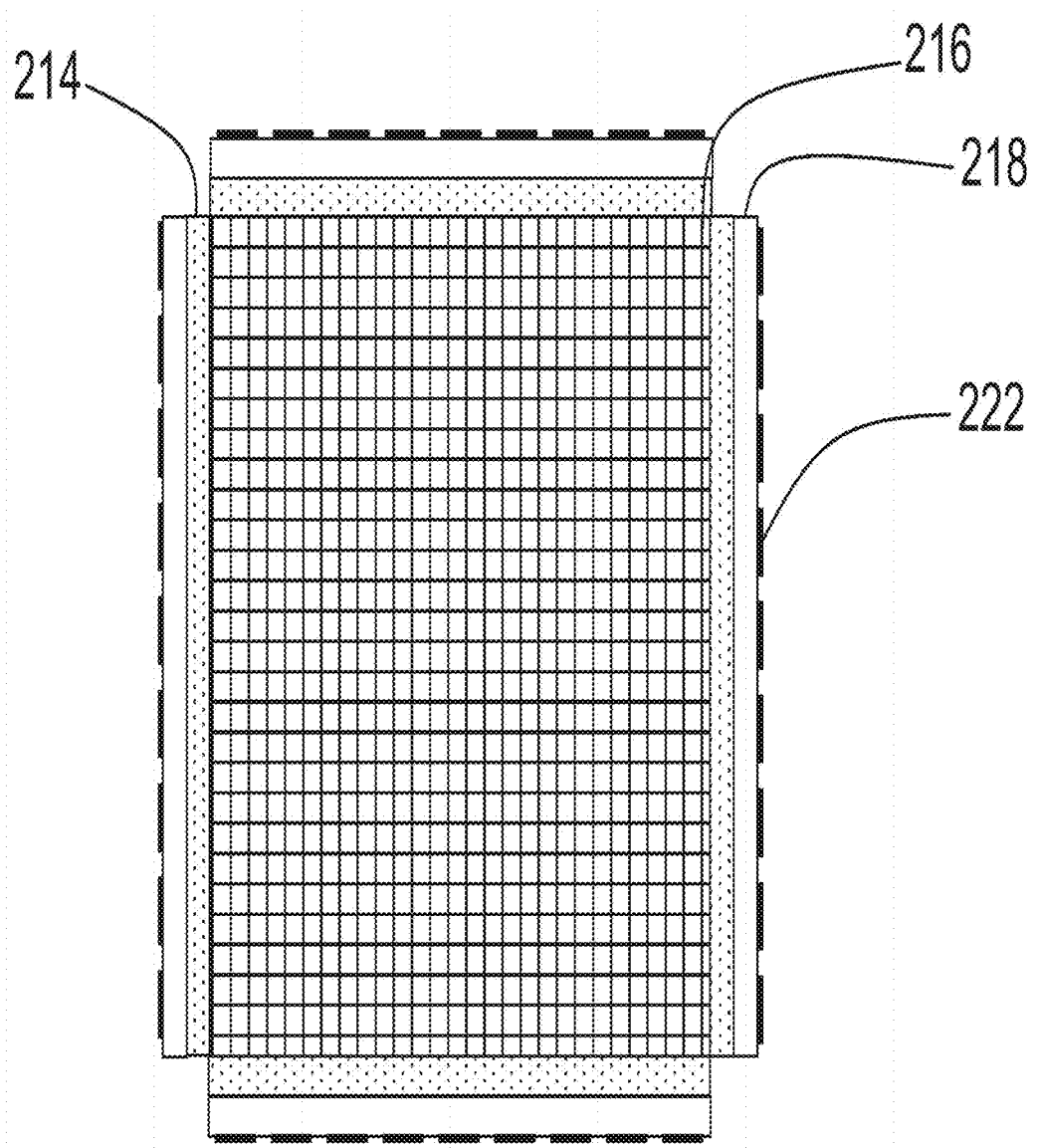
FIG. 7C is a top view of the optical gain block of FIG. 7C showing a fused fiber bundle of erbium doped fibers with a diffusing optical flat bonded to each of four sides, and a VCSEL array bonded to each of the four sides.

FIG. 7C shows an end view of the completed assembly of optical gain block 76, showing a pump laser VCSEL array 218 bonded to the outer surface of each diffuser plate 214. Electrical contacts 222 for anode and cathode of each individual VCSEL 220 of the VCSEL array 218 are brought to the outer surface of VCSEL array 218 by vias etched through the substrate and metal plated. Incoming reflected light enters each erbium doped fiber 216 of the fused fiber bundle 212 at the exposed endface. The fiber cross section is shown here as rectangular or square, but other fiber cross sections may be used which are hexagonal, circular, etc.

FIG. 8 shows a central section view of a second embodiment of the optical gain block 76. Instead of the erbium doped fiber bundle 212 being side pumped as in FIGS. 7A-C, this design end pumps the erbium doped fibers 216 of the fused fiber bundle 212. A receiver housing 224 has a cylindrical flange 226 which is a quick connect optical mount, and may have interior threads for mounting an external lens assembly 228. Cylindrical flange 226 may alternatively provide a bayonet style optical mount, which may be engaged by complementary features on the body of lens assembly 228. Lens assembly 228 may have a plurality of lens elements 230, shown here as a convex lens. However, other lens types may be used, including concave, aspherical, and diffractive arrays for lens element 230. Each lens element 230 is mounted inside a recess 232 formed on an interior surface of lens assembly 228. A plurality of O-rings 234 may be used to provide compliance between the rigid lens elements 230 and the metal body of lens assembly 228. In operation, reflected light 236 passes through lens elements 230 and dichroic optical flat 238, and falls on fused fiber bundle 212. Reflected light 236 is typically at the 1.54 micron wavelength of erbium glass lasers, or in the 1530-1650 nanometer band of semiconductor lasers formed in indium phosphide. Dichroic optical flat 238 passes a broad band of wavelengths in the range of 1530-1650 microns, and reflects light in a narrower band centered at 980 nanometers. A rectangular array of 980 pump laser diodes 240 is positioned in a recess in the sidewall of receiver housing 224 at an angle to the propagation of reflected light 236. In this design, each element 242 of laser diode array 240 is a VCSEL producing an optical beam 244 which falls on diffuser 246 in response to an electrical drive signal supplied through electrical contacts 241. Diffuser 246 is typically a diffractive grating or holographic lens element, which uniformly distributes the light from each optical beam 244 uniformly across the output face of diffuser 246, shown here as a number of smaller optical output beams 248, each produced from a single input beam 244. In this manner, a highly uniform column of light is produced which will uniformly illuminate each erbium doped fiber 216 of fused fiber bundle 212. Output beams 248 fall on the underside of dichroic optical flat 238 and are reflected to the input side of fused fiber bundle 212. In this way, erbium doped fibers 216 which are fused together in fused fiber bundle 212 are optically pumped with 980 nm optical energy. At the other end of fused fiber bundle 212 is another dichroic optical flat 250 which again has the properties of passing broad band of wavelengths in the range of 1530-1650 microns, and reflecting light in a narrower band centered at 980 nanometers. When the attenuated pump light exits fused fiber bundle 212, it encounters the reflecting surface of dichroic optical flat 250, and is returned through the fused fiber bundle for a second pass, thereby increasing the efficiency of the optical pumping process. The dichroic optical flat 250 also passes the reflected light signal which has been amplified by the erbium doped fibers 216 which are acting as erbium doped fiber amplifiers, having been optically pumped to an excited state by pump laser diode array 240. The pump laser diode array 240 can be started 1.2 milliseconds prior to the emission of an illuminating pulse in order to allow for the maximum level of excited states in the erbium doped fibers 216 of fused fiber bundle 212, producing the maximum optical gain. The fluorescence time of erbium doped glass is 1.2 milliseconds, so the maximum gain would require approximately this much advance in the timing of the application of the electrical drive signal to pump laser diode array 240 through electrical contacts 241. New types of erbium doped fibers, doped with nanoparticles, can have doping levels in excess of 10%, compared to a 2-3% level for older products. This allows for a much higher gain per length of fiber. Products such as the DrakaElite fiber from Draka Communications, and QX erbium doped phosphate glass fibers from Kigre, Inc. exhibit such properties and are well suited to the present design. Also, a method of using ytterbium doping to sensitize the erbium doping, and using 1480 nm pump light, produces 26 dB of gain in only 8.8 cm (3.5") of fiber length at L-band (1575-1630 nm). This method would require changing the wavelength of the pulsed laser transmitter 68, and changes to the dichroic optical flats 238 and 250. In the paper entitled, "High-Gain Short-Length Phosphate Glass Erbium-Ytterbium-Doped Fiber Amplifiers", authors Ayman M. Samara, et. al., of the Optoelectronics and Optical Communication Center, Department of Physics, UNC Charlotte, Charlotte, NC describe the structure and methodology to use the ytterbium sensitized erbium doped fibers. Further, in the paper entitled, "The Gain Performance of Ytterbium Doped Fiber Amplifier", by Parekhan M. Jaff, et. al., at the Department of Physics, University of Sulaymania, Kurdistan Region, Iraq, the performance of a ytterbium-only doped fiber is given which produces gains in excess of 20 dB for very short lengths of fiber, though again, the optimal pump wavelength shifts to 910 nm, and the optimal pulse transmission wavelength shifts to 975 nm. Again, changes are required to the wavelength of the pulsed laser transmitter 68, and changes to the dichroic optical flats 238 and 250. Given appropriate levels of optical pumping, pump wavelength, pulse transmission wavelength, and fiber composition, it is expected optical gains in excess of 20 dB may be realized with a short (<6") length of erbium doped fiber 216. For even higher gains, longer sections of fiber may be accommodated by the present design.

Finally, amplified reflected light 236 exits the output side of fused fiber bundle 212 and falls on detector array 78. Detector array 78 is shown mounted to amplifier array 80, which is in turn mounted to a circuit substrate 252. Circuit substrate 252 is held in place by four screws 254, though other fasteners may be used, including staking with deformable plastic, solder reflow, rivets, metal clips, and or adhesive/epoxy systems. On the reverse side of circuit substrate 252 is mounted readout integrated circuit 82 which connects through vias in circuit substrate 252 to amplifier array 80. Alternatively, the focal plane array (FPA) assembly consisting of detector array 78, amplifier array 80, circuit substrate 252, and readout IC (ROIC) 82 may be replaced by any one of a number of different FPA options detailed in FIGS. 11-17.

Figure 9:
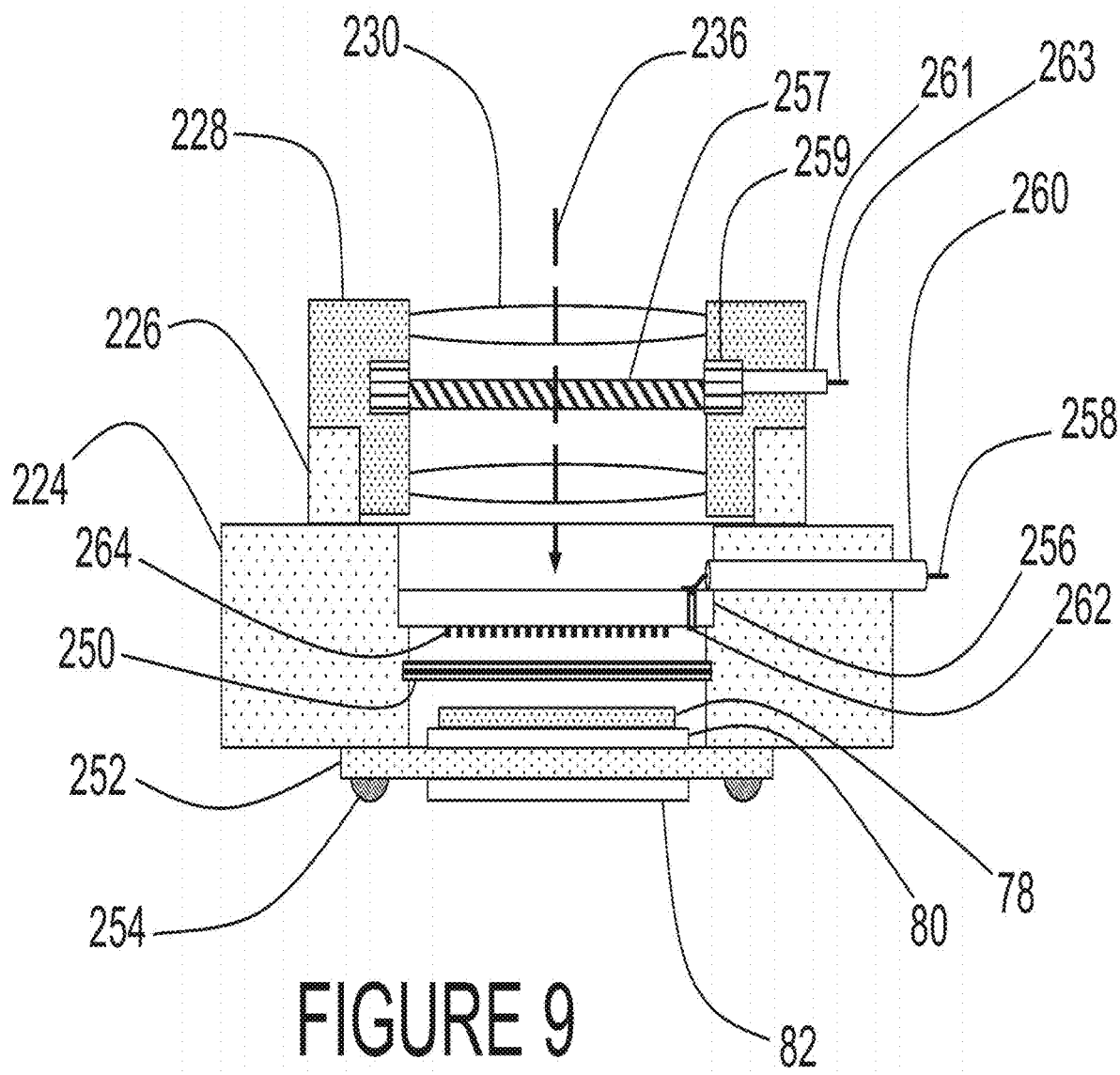
FIG. 9 is a cutaway side view of a ladar sensor having an array of semiconductor optical amplifiers (SOAs) positioned in the light receiving path.

FIG. 9 shows a central section view of a third embodiment of the optical gain block 76. The receiver housing 224, cylindrical flange 226, lens assembly 228, lens elements 230, dichroic optical flat 250, circuit substrate 252, fasteners 254, detector array 78, electronic amplifier array 80, and ROIC 82 are of similar or identical design as in the design of FIG. 8, though the length of receiver housing 224 has been reduced. Replacing fused fiber bundle 212 is vertical cavity semiconductor amplifier (VCSOA) array 256. VCSOA array 256 is formed atop an indium phosphide substrate, and the structure and formation is described in detail in association with FIG. 10. In an alternative design, the indium phosphide substrate may be removed via chemical mechanical polishing (CMP) and a glass optical flat substituted. The individual VCSOA elements 264 optically amplify incoming reflected light 236. The VCSOA 264 optical gain region is electrically pumped through electrical connections 258. Electrical connections 258 in a preferred embodiment are made by a ribbon cable with an insulator 260 around each conductor of electrical connections 258. Connections to the reverse side of VCSOA array 256 are made by through substrate vias 262. In operation, dichroic plate 250 acts as an optical filter, keeping ambient visible and infrared light from reaching detector array 78. An optional mechanical shutter 257 may be operated electrically by actuator 259 which is connected to the system control processor 58 by wire(s) 263, which are insulated from the housing of lens assembly 228 by insulator 261. Mechanical shutter 257 may be a venetian blind type, a rotary iris, a clapper, or a slide. Actuator 259 may be a linear actuator, or a small electric motor or stepper motor with rotary output, depending on the type of shutter specified in the design.

Figure 10A:
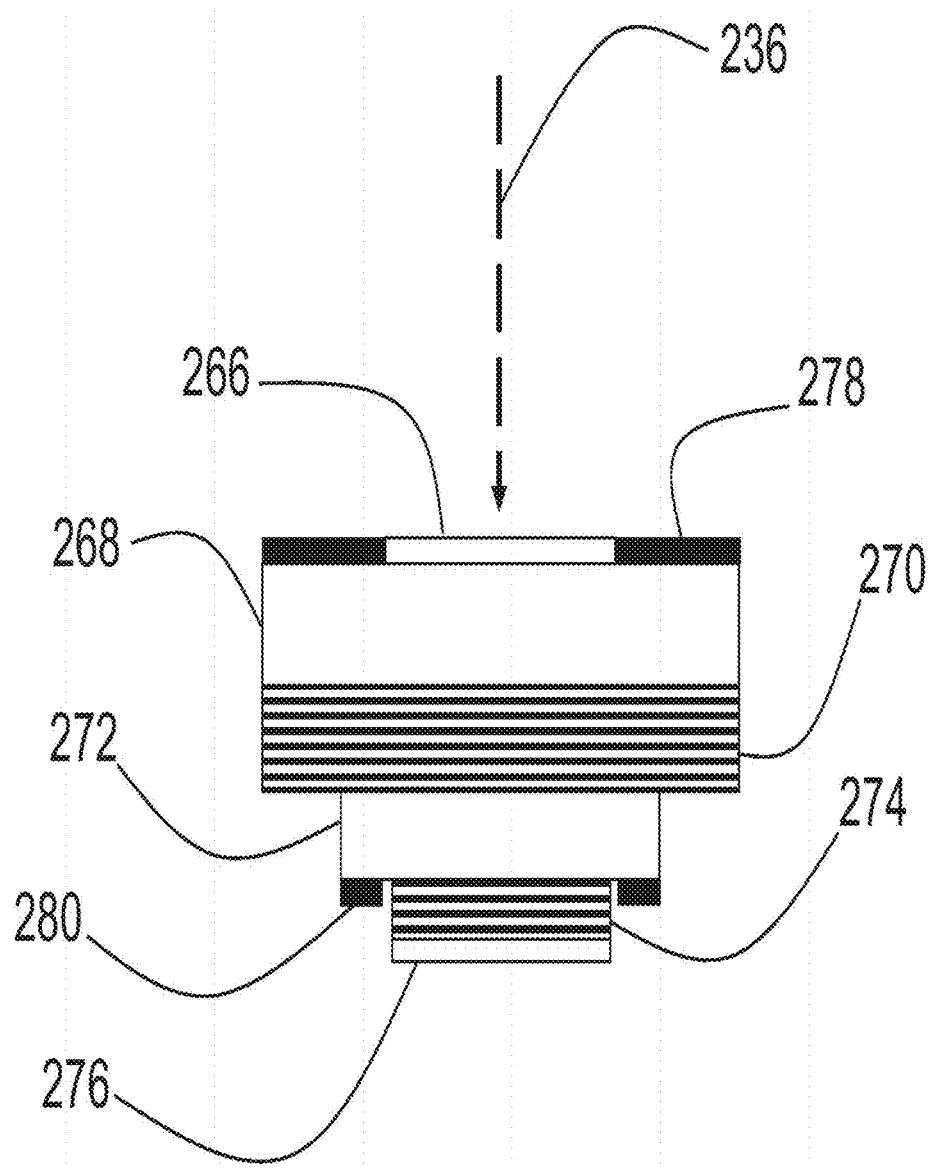
FIG. 10A is a cutaway side view of an individual element of the array of semiconductor optical amplifiers (SOAs) of FIG. 9.

FIG. 10A shows a central section view of a VCSOA element 264. Incoming reflected light 236 enters the VCSOA through an antireflection (AR) coating 266, and passes through substrate 268 which may be indium phosphide, or in an alternative embodiment, an optical flat. Distributed Bragg Reflector (DBR) 270 at the top of the cavity attenuates reflected light 236 before it enters gain region 272 which is a multiple quantum (MQW) well material tuned to the wavelength of the light pulse transmission and reflection. The reflected light signal 236 is then amplified in the gain region which has been electrically pumped through anode 278 and cathode 280 electrical contacts. A DBR 274 at the bottom of the cavity confines the optical mode, allowing for multiple passes through the gain region, creating a type of resonant amplifier. Finally, an AR coating 276 provides for optimal transmission to the detector array 78. Some care must be exercised not to pump the cavity too hard, or else a lasing mode may be excited. The structure may be thought of as a VCSEL operated below the lasing threshold. The DBRs may be formed in indium phosphide (InP), which has been been doped to produce a contrasting index of refraction, or the structure may be formed in indium gallium arsenide (InGaAs), gallium arsenide (GaAs), gallium nitride (GaN), or other suitable opto-semiconductor, depending on the wavelength of transmission.

Figure 10B:
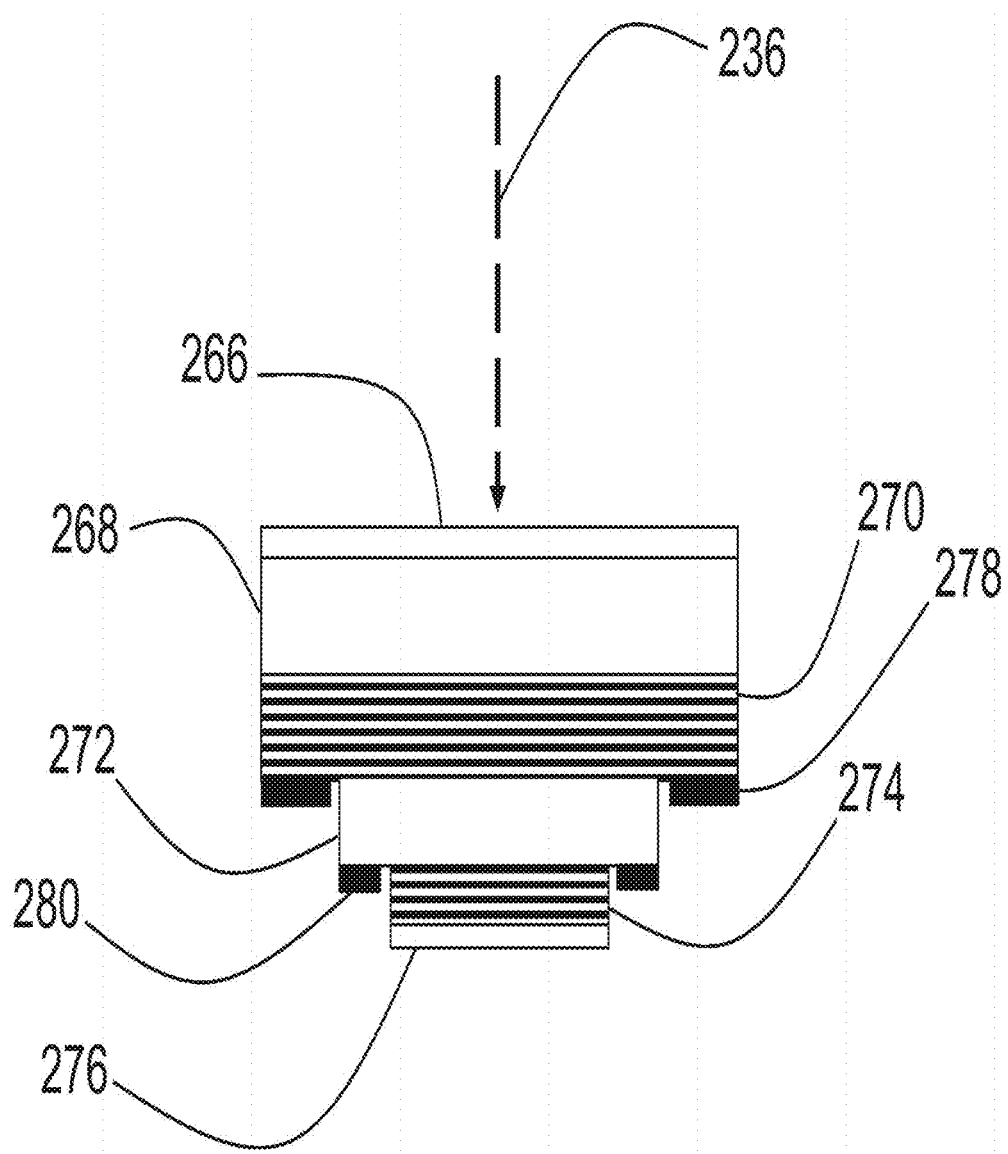
FIG. 10B is a cutaway side view of an individual element of the array of semiconductor optical amplifiers (SOAs) of FIG. 9, showing the formation on an optical flat.

FIG. 10B shows the manner in which the VCSOA elements 264 may be formed by wafer bonding. In this process, an optical flat 268 is the starting point, and AR coating 266 is deposited on the top surface. On the bottom surface of optical flat 268, top DBR 270 is formed by alternating layers of dielectric material, which may be any optical material, such as borosilicate glass, silicon dioxide, silicon nitride, titanium oxide, magnesium fluoride, zinc sulfide, indium antimonide, etc. These films are typically applied by physical vapor depoition (PVD). An InP wafer having on the top surface a MQW gain region 272 is then bonded to the bottom side of optical flat 268, and the majority of the exposed InP substrate is then removed via CMP. A bottom DBR 274 is then formed by alternating layers of dielectric material in a similar manner to top DBR 270. Finally, AR coating 276 is applied, mesas etched, and a metal pattern deposited to form anode 278 and cathode 280 electrical contacts.

Figure 11:
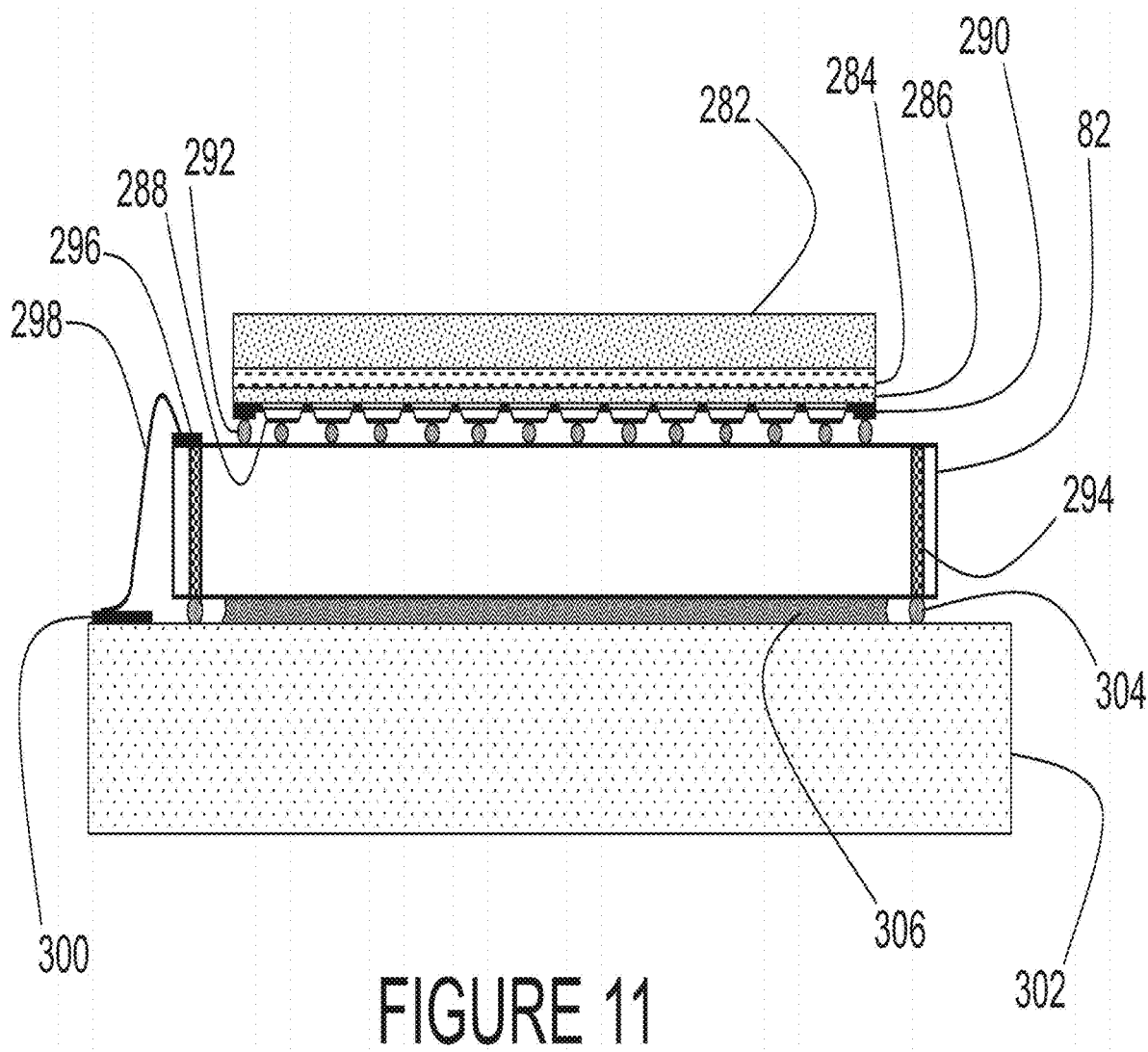
FIG. 11 is a cutaway side view of a hybrid focal plane array (FPA) employing an InGaAs detector array which has been grown on a metamorphic epitaxial layer, which is grown on an inexpensive GaAs substrate. The detector array is mounted to a readout integrated circuit (ROIC), which has a number of front to back interconnects made by through the substrate vias.

FIG. 11 shows a central section view of a preferred embodiment of a focal plane array having a detector array 78. In this design, detector array 78 is formed on an inexpensive gallium arsenide (GaAs) substrate 282. A thin metamorphic layer 284 of graded indium gallium aluminum arsenide (InGaAlAs) is grown on the GaAs substrate to create a crystal structure lattice matched to InGaAs. A thin layer of InGaAs 286 is then grown epitaxially. Finally, a stack of epitaxial layers are grown in InGaAs, and doped to be p-type, n-type, or intrinsic. This layer stack is then etched to form mesas 288. The epitaxial stackup may provide a PIN, NIP, or APD detector type. Shown here is a n-up PIN configuration, with the n-type material illuminated through the substrate, and the p-type material at the apex of each mesa 288. Shown in this figure are 12 detectors for the purpose of clarity, though an array having 128×128 detector elements 288 is typical. Metal is then deposited in a grid pattern, creating a common cathode contact 290. The anode connections of each detector element 288 are made through indium bumps 292 to an amplifier input of a unit cell of the readout integrated circuit (ROIC) 82. Indium bumps 292 may be cold bonded, or may in an alternative embodiment be made of solder and reflowed to make electrical connections. Readout integrated circuit 82 has a number of through substrate vias (TSVs) 294 which connect the circuitry on the top of ROIC 82 to the reverse side. Bonding pads 296 may be used to make some electrical connections through wirebonds 298 to conductive pads 300 on supporting circuit substrate 302. Other electrical connections are made from ROIC 82 to circuit substrate 302 through solder bumps 304. The ROIC 82 die may be eclectically attached to the circuit substrate 302 by solder 306 or by a thermally conductive epoxy in the alternative.

Figure 12:
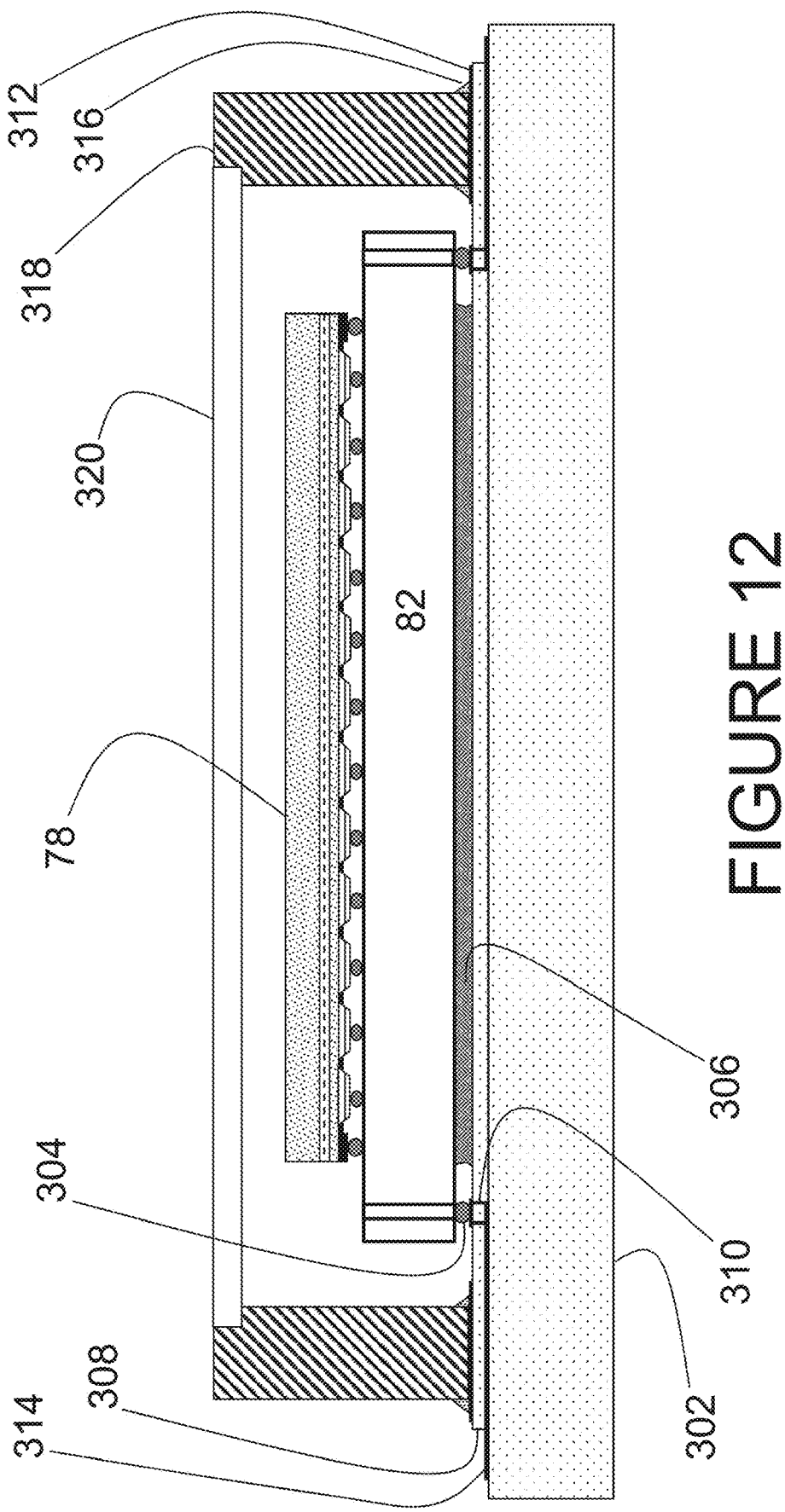
FIG. 12 is a cutaway side view of a hermetic package containing the hybrid focal plane array (FPA) of FIG. 11.

FIG. 12 shows a central section view of a preferred packaging design of a focal plane array having a detector array 78. Detector array 78 may be an M×N rectangular array where N and M may be anywhere from 2 to several hundred pixels on each axis. Circuit substrate 302 is typically a ceramic; either alumina, aluminum nitride, or beryllium oxide, depending on the application. A conductor 314 is formed typically by an additive thick film process, where conductive inks are applied through a silk screen mask or stencil and then fired at an elevated temperature. Conductor 314 may also be formed in a thin film process, where the entire top surface of circuit substrate 302 is covered by a conductive film which is deposited by sputtering or physical vapor deposition (PVD). The surface of circuit substrate 302 is then patterned with photoresist and etched as in a typical printed circuit board (PCB) process. A thick film insulating layer 308 is then printed using silk screen or stencil, and fired. Openings are left in insulating layer 308 for filled conductive vias 310, which are then printed and fired in the same sequence as picture frame shaped conductive pad 312. ROIC 82 with detector array 78 attached is then eclectically attached to circuit substrate 302 with solder 306 or in the alternative, a thermally conductive epoxy. Electrical connections are made from ROIC 82 to circuit substrate 302 by solder bumps 304 which are reflowed prior to sealing of the assembly. A hermetic window cover comprised of flat window glass 320 retained in CoVar® frame 318 is next attached by a continuous solder seam 316. Frame 318 is nickel and gold plated to enhance solderability. Window glass 320 may be other than flat, and may have a lens curvature. Window glass 320 may also have a filter applied to a surface in the form of a thin optical film which rejects all light but the wavelength of interest; typically 1.54-1.57 microns in the present design. Frame 318 may be formed by extrusion or machining, or may be formed in a deep draw process, where it may have a larger radius in the corner where it meets with window glass 320, taking on the shape of a rectangular tub. Window glass 320 is attached to frame 318 by a frit seal process, where a low temperature glass alloy is applied in a frit powder form and the assembly then heated until the glass frit powder reflows, permanently attaching window glass 320 to frame 318. In this manner, a low cost, yet hermetic and high performance package for the FPA assembly may be effected.

Figure 13:
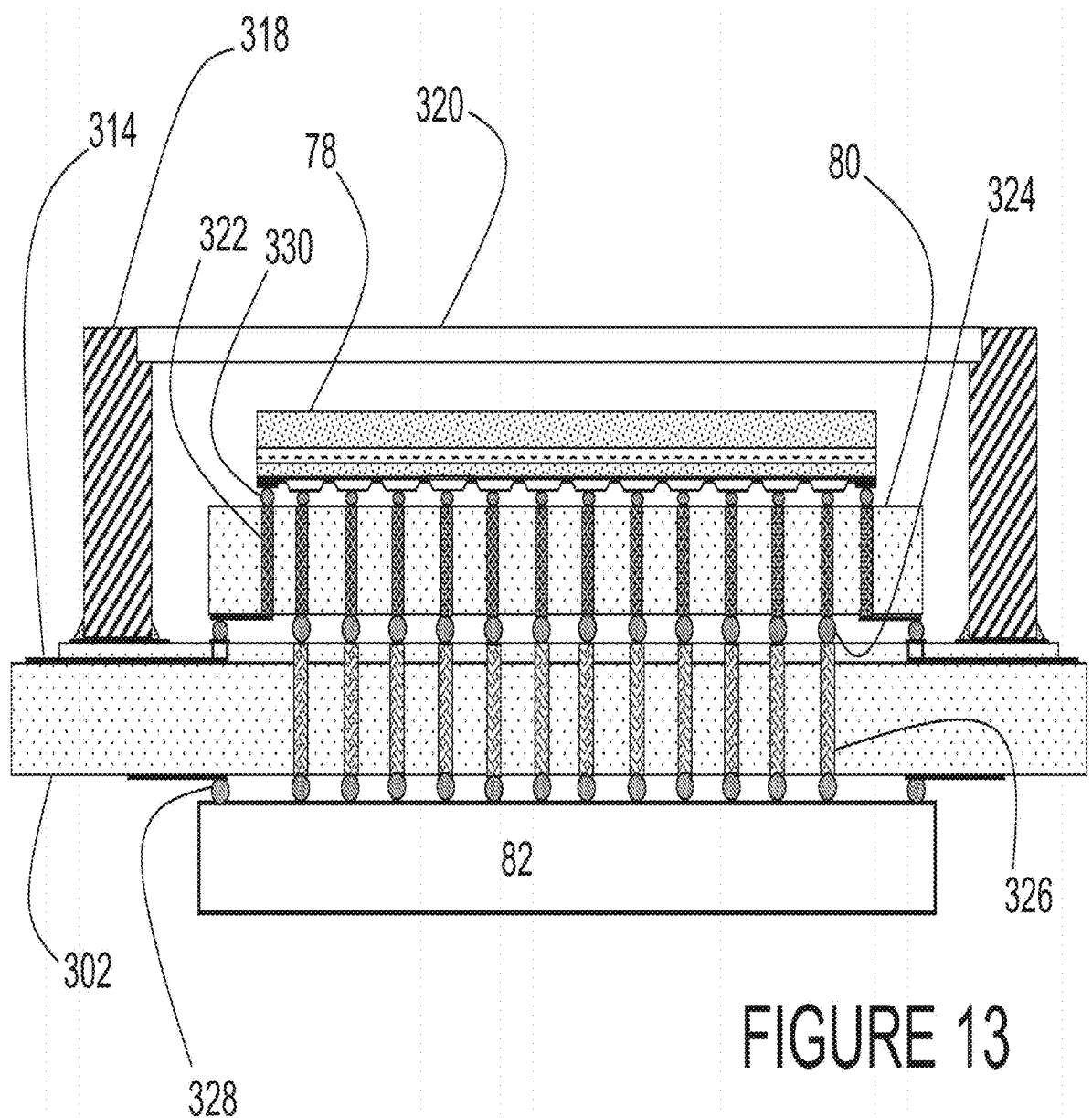
FIG. 13 is a cutaway side view of a hybrid focal plane array (FPA) employing an InGaAs detector array which has been grown on a metamorphic epitaxial layer, grown on an inexpensive GaAs substrate. The detector array is mounted to an electrical amplifier array having front to back electrical contacts made by through the substrate vias (TSVs). The amplifier array is mounted to a substrate which has a hermetic window cover. On the reverse side of the substrate is mounted a readout integrated circuit (ROIC).

FIG. 13 shows a central section view of another preferred packaging design of a FPA having a detector array 78 which incorporates an amplifier array to substitute and augment the input amplifier associated with each unit cell of ROIC 82. The change from the design of FIG. 12 is a simple one, with the ROIC 82 being removed to the reverse side of circuit substrate 302, while the detector is now positioned atop a two-dimensional amplifier array 80. ROIC 82 is typically fabricated in a high speed CMOS process. The process used has a very high density, and a great deal of the available unit cell area is consumed by sampling circuitry and analog memory cells. This limits the ability of circuit designers to realize a high gain transimpedance amplifier of the type which is embodied in amplifier array 80 in the instant design. Amplifier array 80 performs two important functions; the first being the amplification of low level photocurrents received from detector elements 288. Because the technology chosen for amplifier array 80 is a BiCMOS process, high forward gain amplifier circuits are possible. Having the entire unit cell area available for the transimpedance amplifier means sufficient bias current is available to produce the desired gain, without violating power density rules for the amplifier array 80 fabrication. The second important function performed by amplifier array 80 is the transformation of the output impedance of the detector elements 288 from a very high impedance to a much lower impedance, suitable for transmission through the substrate 302. The design of the amplifier array 80 pixel amplifier circuitry will be discussed in association with FIG. 17. Each pixel amplifier of the amplifier array 80 has an input connected to a terminal of a detector element 288 of detector array 78 through an indium bump or solder bump 330, and typically has a single-ended output connected via a TSV 322 to a solder bump 324 on the reverse side. Solder bump 324 is reflowed to connect with a second TSV 326 in circuit substrate 302 which is connected through another solder bump 328 to an input of a unit cell electrical circuit of ROIC 82. Electrical connections to the amplifier array 80 may be through metal pads 314 or TSVs 326, after the package is assembled and sealed as described in FIG. 12. Circuit substrate 302 is typically a thick film ceramic; either alumina, aluminum nitride, or beryllium oxide, depending on the application, but may also be a thin film circuit. As in FIG. 12, a hermetic window cover comprised of flat window glass 320 retained in CoVar® frame 318 is attached by a continuous solder seam.

Figure 14:
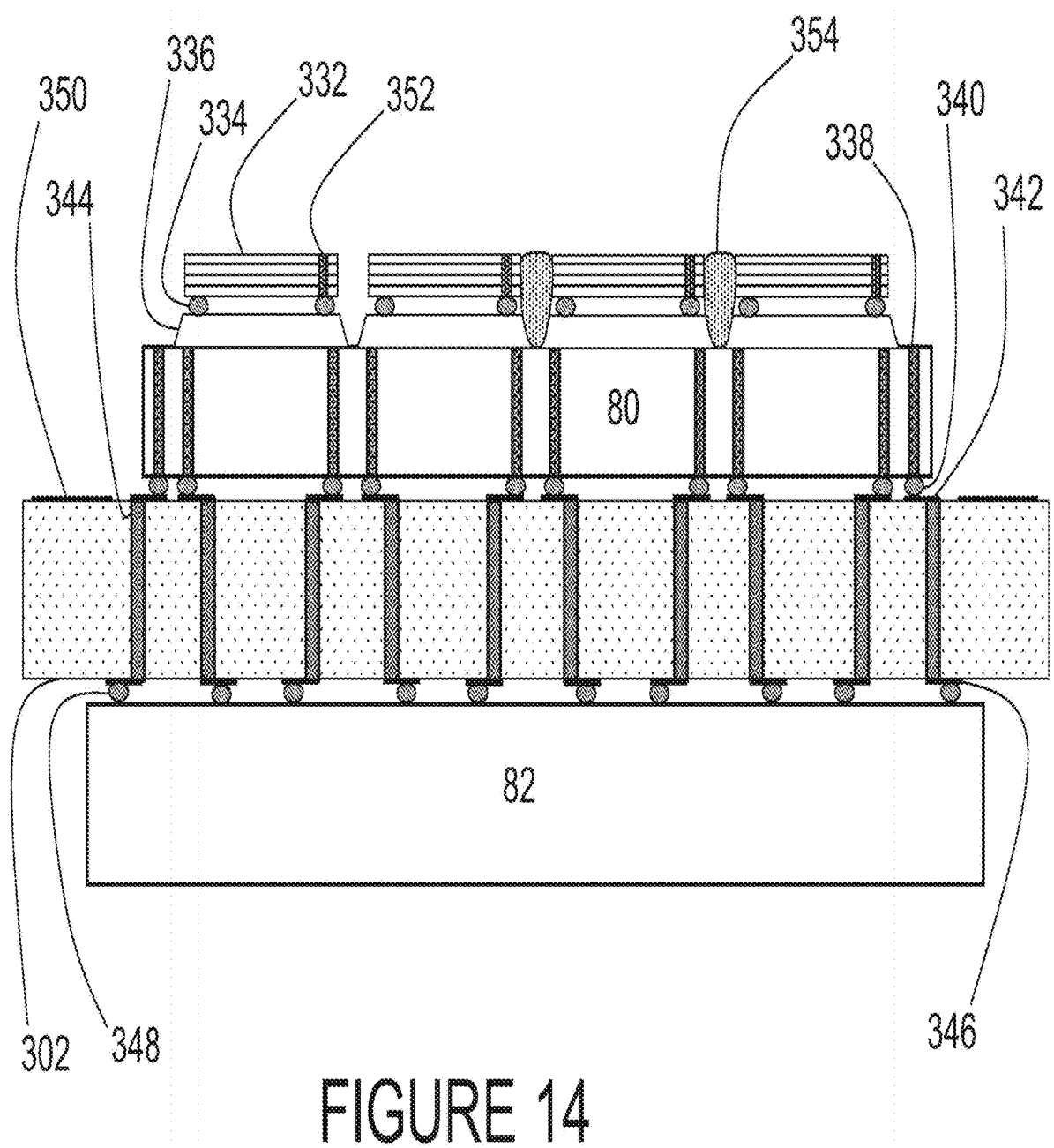
FIG. 14 is a cutaway side view of a hybrid focal plane array (FPA) employing an array of discrete InGaAs detectors mounted to an electrical amplifier array having front to back electrical contacts made by through the substrate vias. The amplifier array is mounted to a printed circuit substrate. On the reverse side of the circuit substrate is mounted a readout integrated circuit (ROIC).

FIG. 14 shows a central section view of yet another preferred focal plane array design, incorporating a detector array 78 comprised of a two-dimensional array of discrete detector elements 332. Each discrete detector element 332 is formed by an epitaxial growth of p-type, n-type, and intrinsic layers of InGaAs on an InP substrate using conventional methods, and mesas formed by etching in the "streets" between detector elements 332. The discrete detector elements 332 are then tested and marked, and singulated via scribe and break or by dicing. Individual detector elements 332 may be as small as 0.2-0.4 mm in the current design. The discrete detector elements 332 shown have both anode and cathode contacts on the top surface, which may be effected by through substrate vias 352 or by lateral processing of the n-type and p-type layers. The individual detector elements 332 may be graded for performance, and are then placed atop amplifier array 80 by a pick and place robot. Modern pick and place assembly robots have very high throughputs, and are capable of handling components with features as small as 0.2 mm. Each detector element 332 is connected to a pixel amplifier 336 of amplifier array 80 through solder bumps 334. Solder bumps 334 connect the anode and cathode of detector element 332 to a pixel amplifier input and a bias voltage output distributed by the pixel amplifier to detector element 332. A through substrate via 338 connects the pixel amplifier outputs to the reverse side of amplifier array 80 where it connects through a solder bump 340 to a metal pad 342 on circuit substrate 302. A through substrate via 344 connects metal pads 342 to the reverse side of substrate 302 and metal pads 346. Metal pads 346 connect to a unit cell electrical circuit of readout IC 82 through solder bumps 348. In the gaps between discrete detector elements 332, a carbon loaded epoxy ink 354 is distributed and cured, providing optical isolation between detector elements 332 of the detector array 78. Therefore, the potential for optical crosstalk between pixels in the image is greatly reduced. Epoxy ink 354 may be spun on and photoimaged and developed in the same manner a photoresist might be applied, or it may be applied using a syringe tip and robotic translation table. Epoxy ink 354 may in an alternative deign be loaded with other IR absorbing materials such as germanium, etc. Metal pads 350 provide a site for the frame 318 of a hermetic window cover to be soldered in place as shown in FIGS. 12 and 13. Thus the reflected light pulse is detected and converted to an electrical signal, amplified and conditioned for transmission through a supporting circuit substrate, and connected to the input of a readout IC which is designed to amplify, threshold, and digitally sample the analog waveshape of the reflected light pulse. All of this is accomplished in an optimal manner by the structure of FIG. 14.

Figures 15A, 15B, 15C, 15D:
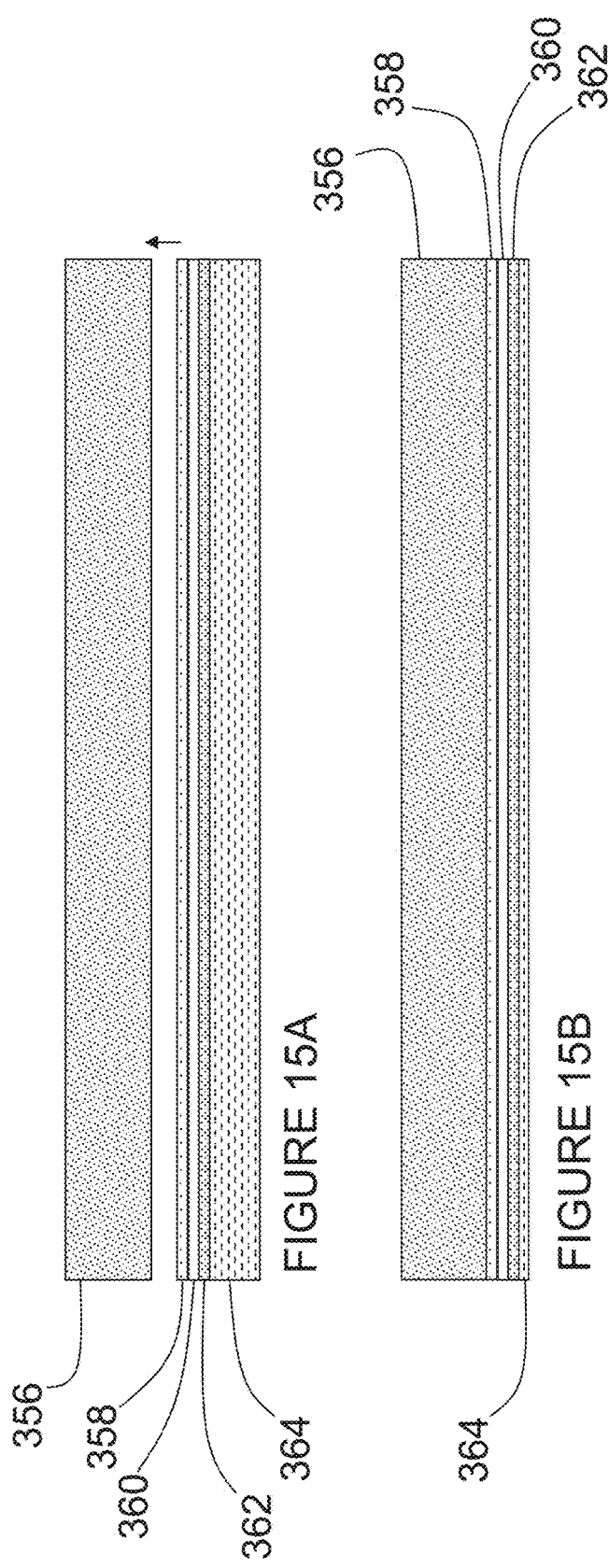
FIG. 15A shows a silicon wafer being bonded to a wafer of indium phosphide having an epitaxial layer of indium gallium arsenide suitable for P-intrinsic-N (PIN) detector formation.
FIG. 15B shows the indium phosphide wafer bonded to the silicon wafer with a major portion of the indium phosphide wafer thickness having been removed.
FIG. 15C shows the formation of isolated mesas of a PIN structure in the indium gallium arsenide epitaxial layer by creation of trenches in the indium phosphide and epitaxial layer of indium gallium arsenide.
FIG. 15D shows the formation of both anode and cathode contacts on the isolated PIN mesa structures.

FIG. 15A shows a central section view of a preferred detector array 78 design which is featured in the FPA packaging design of FIG. 13. This detector array 78 is fabricated by a wafer bonding technique. A heavily doped p-type InP substrate 364 has an InGaAs PIN structure formed epitaxially thereon, with n-type layer 358 grown over intrinsic layer 360, which is formed over the p-type layer 362. This InP substrate 364 is then bonded to silicon wafer 356 using hydrophilic bonding at high temperature, or by a room temperature process using surface activation. The room temperature process is preferred, and is a feature of the Mitsubishi wafer bonding equipment, MWB 04/06E. FIG. 15B shows the next step in the processing of the array, with the majority of the InP substrate removed by chemical mechanical polishing (CMP). Shown at the bottom of FIG. 15B is the remnant semiconductor film of p-type InP 364 which has survived the CMP thinning process. This removal of material allows for the formation of mesa structures 366 by patterning and etching of the bonded wafer using conventional semiconductor process techniques as shown in FIG. 15C. Finally, ohmic contacts are formed, and metal electrodes deposited for both the common cathode 368, and the individual anode contacts 370 for each detector element 288 of the detector array 78. The preferred metallization is Ti/Pt/Au, though Ti/Ni/Au or other schemes may be used. The structure may be inverted, or may be an avalanche photodiode for greater sensitivity. In operation, a positive voltage bias of 2-10 VDC is applied to the cathode of each detector element 288 through the cathode contacts 368 seen at the periphery of the array and in the gaps between mesas which form a 2D grid pattern. The anode contact 370 is connected to the input of a pixel amplifier, and the PIN diode operated in reverse bias mode. This InGaAs PIN on silicon detector array 78 allows for a simplified and more reliable assembly process. Normally, InGaAs PIN diodes must be grown on a lattice matched InP substrate. However, the silicon ROIC 82 to which the detector array 78 is then bonded has a much different coefficient of thermal expansion (CTE) than the InP. Because service temperatures can vary over a 100° C. range, lateral stresses can accumulate and break solder bonds in a conventional InP/silicon ROIC hybrid FPA. Indium remains ductile even at very low temperatures of −55° C., which is why indium bonding is a preferred option in a typical InP/silicon ROIC combination. The new design of FIG. 15 creates a hybrid InGaAs detector array 78 on silicon substrate 356 which has the CTE of silicon, allowing for the use of conventional solder techniques to bond detector array 78 to silicon ROIC 82 or amplifier array 80.

Figure 16:
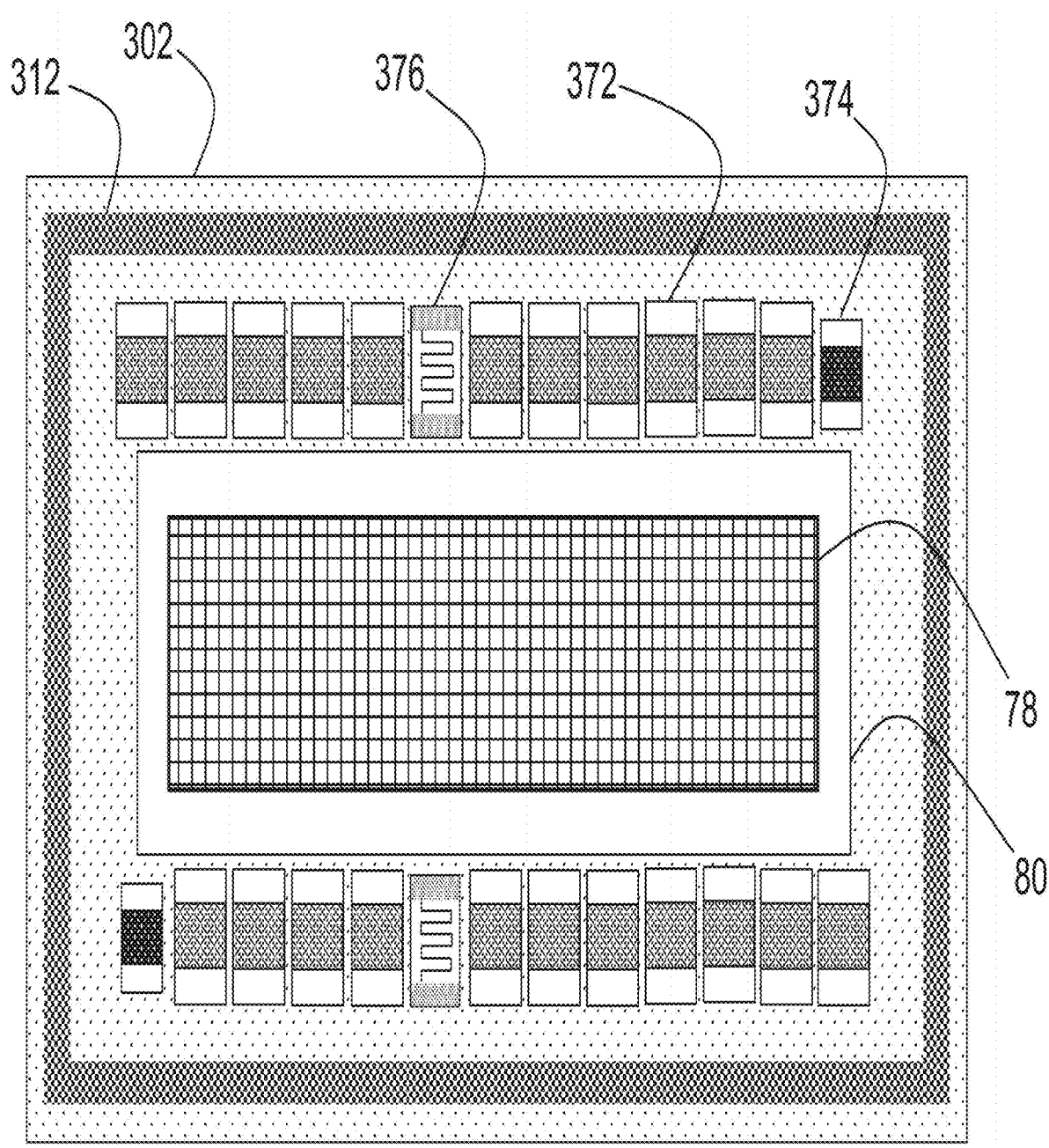
FIG. 16 shows a top view of the detector array of FIG. 16D mounted to a supporting circuit substrate, and having a number of decoupling capacitors mounted along the length.

FIG. 16 shows a top view of the packaging of FIG. 13 with the window cover removed. Circuit substrate 302 has a picture frame shaped metallization pattern 312 suitable for soldering the frame 318 of the window cover in place. Detector array 78 is bonded to amplifier array 80, and a number of capacitors 372 are shown inside the package perimeter, which are useful for decoupling the bias voltages supplied to detector array 78 and amplifier array 80. Also shown are a number of resistors 374 and inductors 376. The resistors 374 may be used to set thresholds, adjust output levels, etc. The inductors 376 can be used as filter elements, or to create peaking in pulse circuits. Other electronic components such as crystals, diodes, etc, may be useful inside the detector array 78 packaging, and may be placed and soldered in a similar manner.

Figure 17:
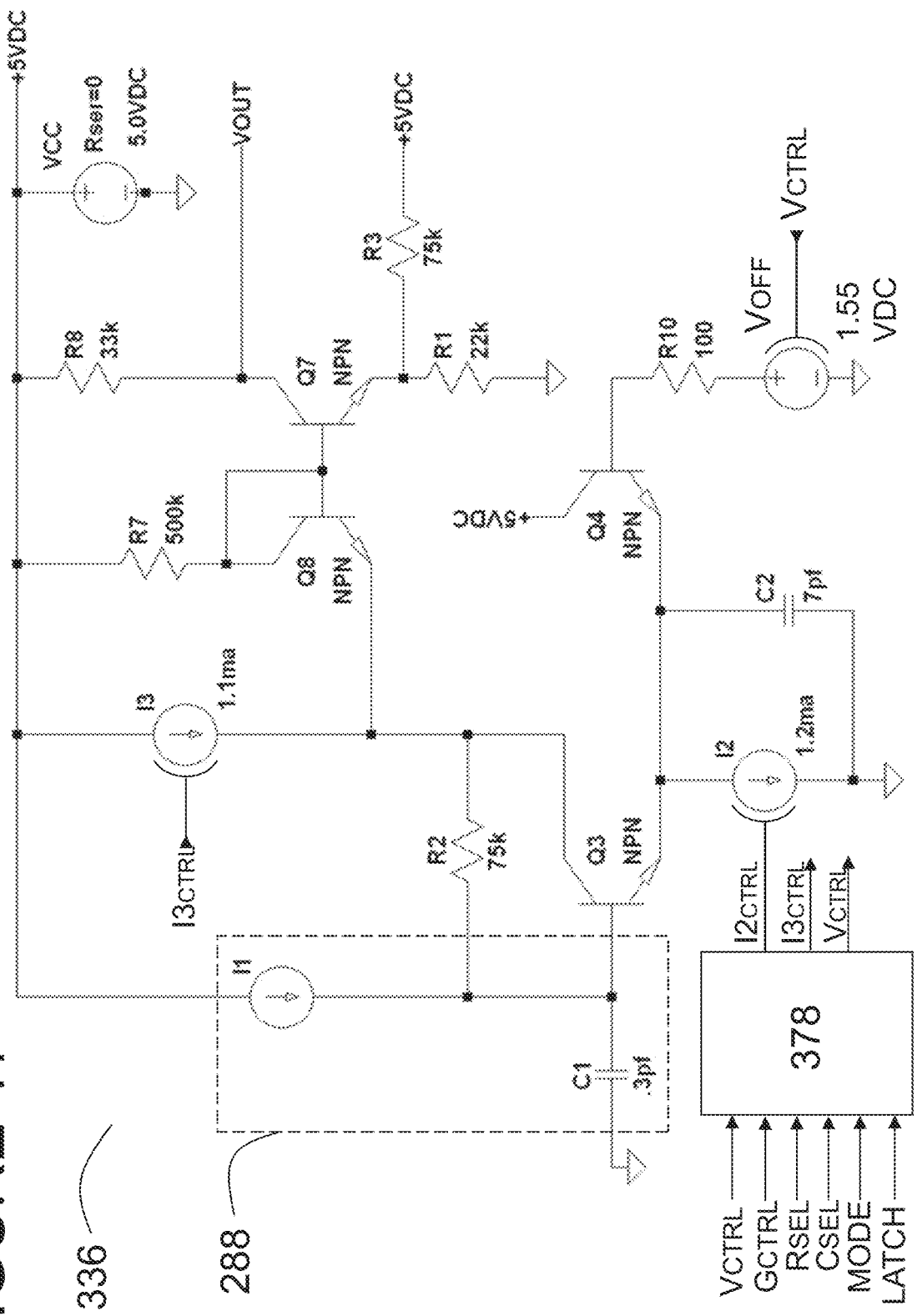
FIG. 17 shows a schematic for a pixel amplifier element of the amplifier array of FIGS. 13-14 and including a detector element of a detector array of the types described in FIGS. 4, 5, 8, and 11-16.

FIG. 17 shows the details of a preferred design of a pixel amplifier 336 of amplifier array 80. The detector element 288 is a preferred design is a PIN diode, and is modeled in the SPICE simulation by the components within dashed line 288. The photocurrent I1 typically varies between 2-100 uA, and the parasitic capacitance of the PIN diode under reverse bias is typically 0.3 pF or less. A differential amplifier consisting of NPN transistors Q3 and Q4 provide sufficient gain to produce the transimpedance gain of 75 kΩ through resistor R2. Completing the differential amplifier structure is variable current source I2, speedup capacitor C2, and the base circuit of Q4. The current through I2 is nominally set to 1.2 mA, but may vary widely to accommodate changes in the desired gain. The base circuit of Q4 is just a variable voltage generator $V_{OFF}$, in series with resistor R10. The collector of Q4 is connected directly to the +5 VDC supply, The collector of Q3 is connected to variable current source I3, and to the second stage amplifier input, which is just the emitter of Q8. In operation, the detector element 288 has a reverse bias leakage current (dark current) which may vary somewhat from one detector element to another. This variation in bias current produces an offset voltage which may be nulled out by adjustment of the variable voltage generator $V_{OFF}$. $V_{OFF}$ is typically set at 1.55 VDC, but may easily change +/−10% to compensate for variations in detector elements 288. $V_{OFF}$ may also change to compensate for the effects of temperature and age on the amplifier circuit and on detector elements 288. Each of these sources of DC error may be compensated for by the circuit of FIG. 17 by proper adjustment of $V_{OFF}$ by the $V_{CTRL}$ output of gain and offset adjustment circuit 378. Resistor R2 is typically 75 kΩ, but may be changed to accommodate different applications, ranging from as low as 5 kΩ to as high as 125 kΩ An optional inverting buffer amplifier stage may be used to adapt the pixel amplifier 336 to legacy ROIC 82 inputs. This optional inverting stage is comprised of transistor Q8 connected in series with resistor R7 as a diode bias for inverting amplifier Q7. R7 may be replaced with a small 5-10 uA current source in some designs. The emitter of Q7 is connected to a 1.14 VDC bias voltage; in this case formed by the resistive divider of R1 and R3. The collector of Q7 is the output, and is connected through a resistor R8 to the positive bias supply. In the present design, +5 VDC is available, and is used to provide higher performance, but the design has been tested with 3.3 VDC and 2.5 VDC supply voltages, though gain, offsets and bias setpoints must be adjusted to provide adequate headroom. In operation, the DC errors are nulled by varying the $V_{CTRL}$ input to the adjustment circuit 378 while the detector array 78 is under bias and darkened by a mechanical shutter 257. The detector array 78 may also be partially darkened by removing the electrical drive to the VCSOA array 256 in systems which are so equipped. Once the offsets are nulled, the value is latched in a memory cell within adjustment circuit 378 by a transition on the LATCH input.

The setpoints of the gain curve for each pixel amplifier 336 may then be established by applying a diffused laser pulse at the receive lens of the ladar sensor, or at the subassembly level. One useful method to determine the gain setpoints is to flood the detector array 78 with uniform pulsed illumination at two, or three levels; typically a maximum, a low level, and a mid-range level. The gain of the pixel amplifier is set by the amount of current provided by voltage controlled current source I2, and the current through voltage controlled current source I3 is set to track the changes in I2 to create optimum load and bias conditions at the collector of Q3. At each level, each pixel amplifier 336 is selected in turn by activating the Row Select ($R_{SEL}$) and Column Select ($C_{SEL}$) outputs, and reading the output electrical signal level through the ROIC 82. A gain adjustment is then calculated by control processor 58, and the gain adjusted in the pixel amplifier by the $G_{CTRL}$ input. The $G_{CTRL}$ input, as well as other inputs to adjustment circuit 378 may be connected directly to control processor 58, or may be passed through ROIC 82. The MODE input is set to calibration mode, and the $G_{CTRL}$ value latched in adjustment circuit 378 by a transition on the LATCH input. Other setpoints on the gain curve for pixel amplifier 336 are determined in the same manner at the one or two remaining optical input power levels, depending on the calibration mode selected. The MODE line is toggled to access these other setpoints. In the fast gain mode, the MODE select line is set to sensitivity time control (STC) mode. When STC mode is selected, the initial gain is set to the lowest value to reduce the possibility of strong reflections from the near field saturating a number of pixels, and bleeding over into adjacent pixels, sometimes called "blooming", and discussed in association with FIG. 1. At the instant the illuminating laser pulse is transmitted, the $G_{TRL}$ input voltage is driven higher, and the gain is rapidly ramped from a first low gain setpoint to a second high gain setpoint. This ramp is done over a short ramp time TR, which is determined by the range at which maximum amplifier gain is desired. TR is often as short as 200 nS for short range systems, but may be as long as 1-10 uS for systems with greater range capability. Typically a range of 1000 feet would require a 2 uS two way time of flight, so the gain would be ramped to the maximum value in 2 uS or less, depending on the power transmitted in the illuminating laser pulse.

In the preferred embodiments described herein, a number of digital processors have been identified, some associated with the host vehicle, some associated with the ladar subsystem, and some associated with the individual ladar sensors. The partitioning and the naming of these various digital processors has been made based on engineering judgment, but other partitioning and naming conventions may be used without changing the scope or intent, or affecting the utility of the invention. The function of those processors associated with the vehicle; the vehicle CPU 48, and the collision processor and airbag control unit 44, may be combined in a single digital processor in some future embodiments. A combined vehicle CPU 48 and collision processor and airbag control unit 44 may also incorporate ladar system controller 30, which is normally associated with the ladar subsystem. The ladar system controller 30 (including control processor 58) may in some alternative embodiments be eliminated as a standalone circuit, and those functions normally performed by ladar system controller 30, as described herein would then be assumed by a more powerful vehicle CPU 48. Likewise, the object tracking processor 98 of the individual ladar sensor could be absorbed into the vehicle CPU 48, as could other ladar sensor processors such as the data reduction processor 86 and control processor 58. This would follow a trend toward greater centralization of the computing power in the vehicle. A trend towards decentralization may also take place in reverse, some alternative embodiments having ever more of the processing power pushed down into the ladar sensor subsystem (FIG. 4). In other alternative embodiments, perhaps in a robotic vehicle where only a single ladar sensor might be installed, substantially all of the processing power could be incorporated in the individual ladar sensor itself. The term digital processor may be used generically to describe either digital controllers or digital computers, as many controllers may also perform pure mathematical computations, or perform data reduction, and since many digital computers may also perform control operations. Whether a digital processor is termed a controller or a computer is a descriptive distinction, and not meant to limit the application or function of either device.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

The invention claimed is:

1. A ladar system mountable to a vehicle, said system comprising:
    a laser transmitter comprising at least one semiconductor laser having a pulsed laser light output configured to transmit light through a transmitting optic adapted to illuminate a reflecting surface in a field of view;
    a laser drive circuit connected to said at least one semiconductor laser and adapted to electrically drive said at least one semiconductor laser in a predetermined sequence;
    a laser beam steering mechanism adapted to scan the pulsed laser light output sequentially through the field of view;
    a time zero reference circuit having a time zero reference electrical output configured to signal the beginning of a pulsed laser light transmission;
    receiving optics adapted to collect and condition the pulsed laser light reflected from the reflecting surface;
    a two-dimensional array of light sensitive detectors positioned at a focal plane of said receiving optics, each of said light sensitive detectors configured to intercept a pixellated portion of the pulsed laser light output reflected from the reflecting surface, and each light sensitive detector having an output configured to produce an electrical response signal;
    a detector bias circuit connected to a voltage distribution grid of said array of light sensitive detectors; and
    a readout integrated circuit with a clock circuit and a plurality of unit cell electrical circuits;
    each of said unit cell electrical circuits having an input connected to said clock circuit and to said time zero reference electrical output, and having an amplifier with an input connected to one of said light sensitive detector outputs, and each amplifier having an output, and a pulse detection circuit connected to said amplifier output, and said pulse detection circuit having a termination output, a counter connected to said time zero reference electrical output and to said clock circuit, said counter started counting by the time zero reference electrical output, and said counter connected to, and stopped counting by the termination output, and the counter having an output proportional to the distance to the reflecting surface, thereby establishing a direct time of flight distance measurement.

2. The ladar sensor of claim 1 wherein said at least one semiconductor laser is selected from the set of an edge emitting laser and a surface emitting laser.

3. The ladar sensor of claim 1 wherein said beam steering mechanism is a microelectromechanical system.

4. The ladar sensor of claim 3 wherein said microelectromechanical system is formed in silicon.

5. The ladar system of claim 1 wherein said predetermined sequence is a line-by-line illumination of the field of view.

6. The ladar system of claim 1 wherein said predetermined sequence is a pixel-by-pixel illumination of the field of view.

7. The ladar sensor of claim 1 wherein said ladar sensor is integrated into an assembly selected from the set of a headlight, a turn signal, taillight, parking light, and brake light.

8. The ladar sensor of claim 1 wherein said two-dimensional array of light sensitive detectors is formed in a material selected from the set of silicon, indium gallium arsenide, indium gal
    lium arsenide phosphide, aluminum gallium arsenide, and indium gallium nitride.

9. The ladar sensor of claim 1 wherein said two-dimensional array of light sensitive detectors is adapted to provide multiplication of at least one photoelectron.

10. The ladar sensor of claim 1 wherein said two-dimensional array of light sensitive detectors is selected from the set of an avalanche photodiode array and an image tube focal plane array.

11. A ladar system comprising:
    a laser transmitter comprising at least one semiconductor laser configured to produce a pulsed laser light output through a transmitting optic adapted to illuminate a field of view;
    a laser drive circuit connected to said at least one semiconductor laser and adapted to electrically drive said at least one semiconductor laser in a predetermined sequence;

a laser beam steering mechanism adapted to scan the pulsed laser light output sequentially through the field of view;

a time zero reference circuit configured to signal the beginning of a pulsed laser light transmission;

receiving optics adapted to collect and condition the pulsed laser light reflected from reflecting surface in the field of view;

a two-dimensional array of light sensitive detectors positioned at a focal plane of said receiving optics, each of said light sensitive detectors configured to receive a pixellated portion of the pulsed laser light output reflected from the reflecting surface and produce an electrical response signal in response to receiving the pixelated portion of the pulsed laser light output;

a detector bias circuit connected to a voltage distribution grid of said array of light sensitive detectors; and a plurality of unit cell electrical circuits, each of said unit cell electrical circuits coupled to one of said light sensitive detector outputs and said time zero reference circuit and configured to determine a direct time of flight distance measurement to the reflecting surface.

\* \* \* \* \*